US010432449B2

United States Patent
Dong et al.

(10) Patent No.: US 10,432,449 B2
(45) Date of Patent: Oct. 1, 2019

(54) SEMANTICS ANNOTATION AND SEMANTICS REPOSITORY FOR M2M SYSTEMS

(71) Applicant: Convida Wireless, LLC, Wilmington, DE (US)

(72) Inventors: Lijun Dong, San Diego, CA (US); Dale N. Seed, Allentown, PA (US); Hongkun Li, Malvern, PA (US); William Robert Flynn, IV, Schwenksville, PA (US); Chonggang Wang, Princeton, NJ (US); Guang Lu, Thornhill (CA); Catalina M. Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 318 days.

(21) Appl. No.: 14/982,614

(22) Filed: Dec. 29, 2015

(65) Prior Publication Data

US 2016/0191295 A1    Jun. 30, 2016

Related U.S. Application Data

(60) Provisional application No. 62/098,011, filed on Dec. 30, 2014, provisional application No. 62/136,198, filed on Mar. 20, 2015.

(51) Int. Cl.
*G06F 16/22*    (2019.01)
*G06F 16/955*    (2019.01)
(Continued)

(52) U.S. Cl.
CPC ........ *H04L 41/024* (2013.01); *G06F 16/2246* (2019.01); *G06F 16/95* (2019.01); *G06F 16/9558* (2019.01)

(58) Field of Classification Search
USPC .......................................................... 707/741
See application file for complete search history.

(56) References Cited

U.S. PATENT DOCUMENTS 7,933,764 B2    4/2011    Kang et al.
8,200,617 B2    6/2012    Spivack et al.
(Continued)

FOREIGN PATENT DOCUMENTS

| JP | 2006-302085 A | 11/2006 |
|---|---|---|
| KR | 10-2011-0051519 | 5/2011 |
| WO | 2014/182706 A1 | 11/2014 |

OTHER PUBLICATIONS

International Patent Application No. PCT/US2015/067839: International Preliminary Report on Patentability dated May 25, 2017, 17 pages.
(Continued)

*Primary Examiner* — Muluemebet Gurmu
(74) *Attorney, Agent, or Firm* — BakerHostetler

(57) ABSTRACT

Methods, systems, and devices may be used to annotate and store "semantics of normal resources" (hereinafter resource semantics). These methods, systems, and devices may be a part of a functional architecture for semantics support and allow for semantics based query. Also methods, systems, and devices associated with a semantics child resource may be created within a resource in order to represent semantics information.

20 Claims, 28 Drawing Sheets

(51) Int. Cl.
  *G06F 16/95* (2019.01)
  *H04L 12/24* (2006.01)

(56) References Cited

U.S. PATENT DOCUMENTS

| | | | |
|---|---|---|---|
| 8,359,193 B2 | 1/2013 | Chen et al. | |
| 8,868,560 B2 | 10/2014 | Spivack et al. | |
| 2007/0233457 A1* | 10/2007 | Kang | G06F 17/30734 704/8 |
| 2009/0177777 A1* | 7/2009 | Behrendt | G06F 17/30734 709/226 |
| 2010/0241978 A1* | 9/2010 | Genovese | G06F 9/451 715/765 |
| 2012/0117015 A1 | 5/2012 | Sathish | |
| 2013/0159451 A1* | 6/2013 | Luciw | H04L 67/2842 709/213 |
| 2014/0165002 A1 | 6/2014 | Kang | |
| 2016/0004767 A1* | 1/2016 | Song | G06F 17/30861 707/769 |

OTHER PUBLICATIONS

Hebeler et al, "Semantic Web Programming", Wiley Publishing, Inc., 2009, 617 pages.
Resource Description Framework (RDF): Concepts and Abstract Syntax, W3C Recommendation, Feb. 10, 2004, 1-21, www.w3.org/TR/rdf-concepts/.
OneM2M Technical Specification, TS-0007-Service_Component_Architecture-V0_2_0, May 15, 2014, 1-47.
OneM2M-TS-0001-V-1.1.0, "OneM2M Functional Architecture Baseline Draft", Aug. 9, 2014.
Sesame, OpenRDF Data, Modified Oct. 15, 2014, www.openrdf.org.
RDF Vocabulary Description Language 1.0: RDF Schema W3C Proposed Recommendation, Dec. 15, 2003, 1-12, www.w3.org/TR/2003/PR-rdf-schema-20031215.
Apache Jena, Version 2.0, The Apache Software Foundation, 2011-2015, www.jena.apache.org.
SPARQL Query Language for RDF, W3C Recommendation Jan. 15, 2008, 1-72, www.w3.org/TR/rdf-sparql-query/.
Henning Hasemann et al, "Annotating Real-World Objects Using Semantic Entities", Wireless Sensor Networks, Feb. 13, 2013, 67-82.
International Application No. PCT/US2016/067839: International Search Report and the Written Opinion dated Apr. 12, 2016, 12 pages.
Kawazoe et al., "Toward Leveraging SS-MIX2 Standardized Storage with Linked Data: Feasibility Study for Federation Queries to Identify Adverse Drug Events", Japan Journal of Medical Informatics, Paper Collection of the 34th Japan Association for Medical Informatics Convention (15th Academic Conference of Japan Association for Medical Informatics), Japan Association for Medical Informatics, Nov. 6, 2014, vol. 34, pp. 328-331.
English Translation of JP Office Action dated Jul. 27, 2018 for JP Application No. 2017534815.

* cited by examiner

```
<owl:Class rdf:ID="Father">
<owl:intersectionOf
rdf:parseType="Collection">
<owl:Class rdf:about="#Parent"/>
<owl:Class rdf:about="#Male"/>
</owl:intersectionOf>
</owl:Class>
```

@prefix rdf: http://www.w3.org/1999/02/22-rdf-syntax-ns# .
@prefix rdfs: http://www.w3.org/2000/01/rdf-schema# .
@prefix sclass: coap://OR/classes/ .
@prefix srelation: coap://OR/relationships/ .
@prefix gym1FDA: coap://gymCSEL1F/applications/ .

| | | |
|---|---|---|
| gym1FDA:treadmill1 | rdf:type | sclass:DeviceApp ; |
| | srelation:identifier | "treadmill1" ; |
| | srelation:producesData | /trainingContainer ; |
| | srelation:availability | 19:00:00^xsd:time , 19:30:00^xsd:time ; |
| | srelation:makeYear | "2012". |
| | | |
| gym1FDA:treadmill2 | rdf:type | sclass:DeviceApp ; |
| | srelation:identifier | "treadmill2" ; |
| | srelation:producesData | /trainingContainer ; |
| | srelation:availability | 20:00:00^xsd:time , 21:00:00^xsd:time ; |
| | srelation:makeYear | "2009". |
| | | |
| gym1FDA:treadmill3 | rdf:type | sclass:DeviceApp ; |
| | srelation:identifier | "treadmill3" ; |
| | srelation:producesData | /trainingContainer ; |
| | srelation:availability | 19:00:00^xsd:time , 20:30:00^xsd:time ; |
| | srelation:makeYear | "2013". |

FIG. 28

SEMANTICS ANNOTATION AND SEMANTICS REPOSITORY FOR M2M SYSTEMS

CROSS-REFERENCE TO RELATED APPLICATIONS

This application claims the benefit of U.S. Provisional Patent Application No. 62/098,011, filed on Dec. 30, 2014, entitled "Semantics Annotation and Semantics Repository for M2M Systems" and U.S. Provisional Patent Application No. 62/136,198, filed on Mar. 20, 2015, entitled "Semantics Annotation and Semantics Repository for M2M Systems," the contents of both are hereby incorporated by reference herein.

BACKGROUND

The rapid increase in the number of network-enabled devices and sensors deployed in physical environments is changing communication networks. It is predicted that within the next decade billions of devices will generate a myriad of real world data for many applications and services by service providers in a variety of areas such as smart grids, smart homes, e-health, automotive, transport, logistics, and environmental monitoring. The related technologies and solutions that enable integration of real world data and services into the current information networking technologies are often described under the umbrella terms of the Internet of things (IoT) or machine-to-machine (M2M) communications. Because of the large amount of data created by devices there is a need for an efficient way to identify and query this data.

An example is a patient monitoring application that may be provided by a patient's hospital or rehabilitation center using compact biomedical wireless sensor motes that use an actuator as an aggregation point. The actuator transmits data to the network. These small wearable resource constrained devices are examples of M2M devices that may be deployed on a patient to continuously monitor vital signs such as blood pressure and flow, core temperature, oxygen saturation, motion, heart rate, hearing, and vision, among other things. Various kinds of M2M data collected by the M2M devices may be used by the patient's doctor, personal trainer (e.g., for 24 hour fitness), or an ambulance service, among others. In order to enable the doctor, personal trainer, and the ambulance service to use the data generated from M2M devices, the semantics of those resources should be available too. The semantics provide a descriptive definition of the data such that the format and structure of the data can be understood (i.e., the semantics provide meaning for the data).

M2M semantic support is intended to enable semantics to the resources for universal understanding/interpretation of them, as well as any advanced processing on them, e.g., semantic query, data analytics, etc. Introduced in the background section below are the existing technologies that are developed in Semantics Web as well as an exemplary M2M architecture (e.g., oneM2M architecture).

The oneM2M standard (oneM2M-TS-0001 oneM2M Functional Architecture-V-1.1.0) under development defines a service layer called common service entity (CSE), as illustrated in FIG. 3. The Mca reference point interfaces with an application entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. CSE contains multiple logical functions called "Common Service Functions (CSFs)", such as "Discovery" or "Data Management & Repository." FIG. 4 illustrates example CSFs for oneM2M.

oneM2M architecture enables the application service node (ASN), application dedicated node (ADN), the middle node (MN), and the infrastructure node (IN). The ASN is a node that contains one CSE and contains at least one AE. An example of physical mapping is an ASN residing in an M2M Device. The ADN is a node that contains at least one AE and does not contain a CSE. An example of physical mapping is an ADN residing in a constrained M2M Device. An MN is a node that contains one CSE and contains zero or more AEs. An example of physical mapping for an MN is an MN residing in an M2M Gateway. The IN is a node that contains one CSE and contains zero or more AEs. An example of physical mapping for an IN is the IN residing in an M2M Service Infrastructure.

The M2M Service Architecture described in (Service Component Architecture, TS-0007 Service Component Architecture-V-1.1.0) augments the oneM2M Functional Architecture by specifying M2M Services provided to M2M Application and M2M Service Providers. The components, shown in FIG. 5, are a service exposure component, network service utilization component, and a remote service exposure component. The service exposure component exposes services to AEs. The network service utilization component consumes services from the NSE. And the remote service exposure component connects Services from different M2M environments.

The Semantics Web is discussed below. The Semantics Web uses a combination of a schema language and an ontology language to provide the capabilities of ontologies. An ontology uses a predefined, reserved vocabulary to define classes and the relationships between them for a specific area of interest, or more. Resource Description Framework Schema (RDFS) as defined by the World Wide Web Consortium (W3C) (e.g., RDF Vocabulary Description Language 1.0: RDF Schema) provides a specific vocabulary for Resource Description Framework (RDF) that may be used to define classes and properties. The Web Ontology Language (OWL) extends the RDFS vocabulary with additional resources that may be used to build more expressive ontologies for the web. A property establishes relationships between resources. It may be considered the same as relationship as discussed herein. A property can be identified by URI/URL. It is one of the fundamentals that compose an ontology.

RDF is a framework for representing information in the Web. RDF is essentially a data-model. Its basic building block is a resource-property-value triple, called a statement. RDF has been given syntax in XML, JSON, etc.

FIG. 1 illustrates a semantics example, which may use RDF. RDF graph as a tool for representing information. The graph is abstract—good for human analysis, but less so for application exchange. RDF statements may also be represented in a concrete format, such as a file or other byte stream. The most popular used expressive formats are RDF/XML (RDF language 802) and the Terse RDF Triple Language (Turtle) 804. RDF has three components: a subject, a predicate, and an object. The subject is the resource being described. In RDF, a resource can be anything that is uniquely identifiable via a Uniform Resource Identifier (URI). The object of a statement is the target being acted upon the subject. Like the subject, it can be a resource identified by a URI, but it can alternatively be a literal value like a string or a number. The predicate of a statement determines what kind of relationship holds between the subject and the object. It is also identified by a URI.

In the example, as shown in FIG. 1, a statement 801 shows that John Smith's title is Professor, which may be represented in RDF language 802. The xmlns:uni 803 is the self-defined domain name, in which the properties (Name and title) are defined as part of the RDFS. RDF is domain-independent, such that no assumptions about a particular domain of use are made. It is up to the users to define their own terminology in a schema language called RDF Schema (RDFS). RDFS defines the vocabulary used in RDF data models. In RDFS, the vocabulary may be defined, relationships between object may be described, and properties may be specified to apply to particular kinds of objects, which may include the values the objects can take.

The web ontology language (OWL) extends the RDFS vocabulary with additional resources that may be used to build more expressive ontologies for the web. OWL introduces additional restrictions regarding the structure and contents of RDF documents in order to make processing and reasoning more computationally feasible. For example, OWL defines properties that correspond to the standard set operators: intersection, union, and complement to define Boolean combinations of classes. FIG. 2 illustrates an example of using intersection to define the concept Father. Father is exactly the intersection of the classes Parent and Male. In other words, anyone who is a Father is both a Parent and a Male, and anyone who is both a Parent and a Male is a Father. At first glance, it might appear that the OWL is equivalent to saying Father is rdfs:subClassOf Parent and Father is rdfs:subclassOf Male. However, these two sub-ClassOf statements only state that all fathers must be parents and male. They cannot be used to infer that someone is a father from only their gender and parenthood, as can be done using owl:intersectionOf.

OWL uses the RDF and RDFS, XML schema datatypes, and OWL namespaces. The OWL vocabulary itself is defined in the namespace http://www.w3.org/2002/07/owl# and is commonly referred to by the prefix owl. Datatypes represent ranges of data values that are identified using URIs. OWL allows you to use a number of predefined datatypes, most of which are defined in the XML Schema Definition (XSD) namespace. OWL allows a user to define her own datatypes by extending XSD.

RDF data may be stored and queried using a triple store framework. Triple store provides a mechanism for persistent storage and access of RDF graphs. A few examples of existing triple store implementations are Jena and Sesame. Jena (https://jena.apache.org/) is a java framework for building semantic web applications. Jena implements application programming interfaces (APIs) for dealing with Semantic Web building blocks such as RDF and OWL. Jena's fundamental class for users is the Model, which is an API for dealing with a set of RDF triples. A Model can be created from the file system or from a remote file. Sesame (http://rdf4j.org/) is an open source framework for storage, inferring, and querying of RDF data. Sesame matches the features of Jena with the availability of a connection API, inferring support, availability of a web server and SPARQL endpoint.

With this background of semantics and an M2M architecture, there is a need for determining how semantics can work within an M2M architecture.

SUMMARY

Lack of semantic awareness prevents M2M service layers from offering services which allow data produced by M2M applications to be effectively abstracted or virtualized by the M2M service layer such that it can be discovered, accessed, interpreted, and shared by different applications even if they do not have any prior knowledge of the application from which the data originated.

Disclosed herein are methods, systems, and devices that may be used for annotating and storing "semantics of normal resources" (hereinafter resource semantics). These methods, systems, and devices may be a part of a functional architecture for semantics support and allow for semantics based query. Disclosed are ways to facilitate the use of a single annotation for multiple resources and storage of annotations away from the annotation subject. Also discussed herein, among other things, are methods, systems, and devices for using a semantics child resource to help represent semantics information.

In an example, a device may include a processor and a memory coupled with the processor. The memory includes executable instructions that when executed by the processor cause the processor to effectuate operations include automatically generating semantics annotation instance of a resource and providing the semantics annotation instance to a client based on a request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 28 illustrates example of semantics annotation instance representation;

DETAILED DESCRIPTION

Figure 1:
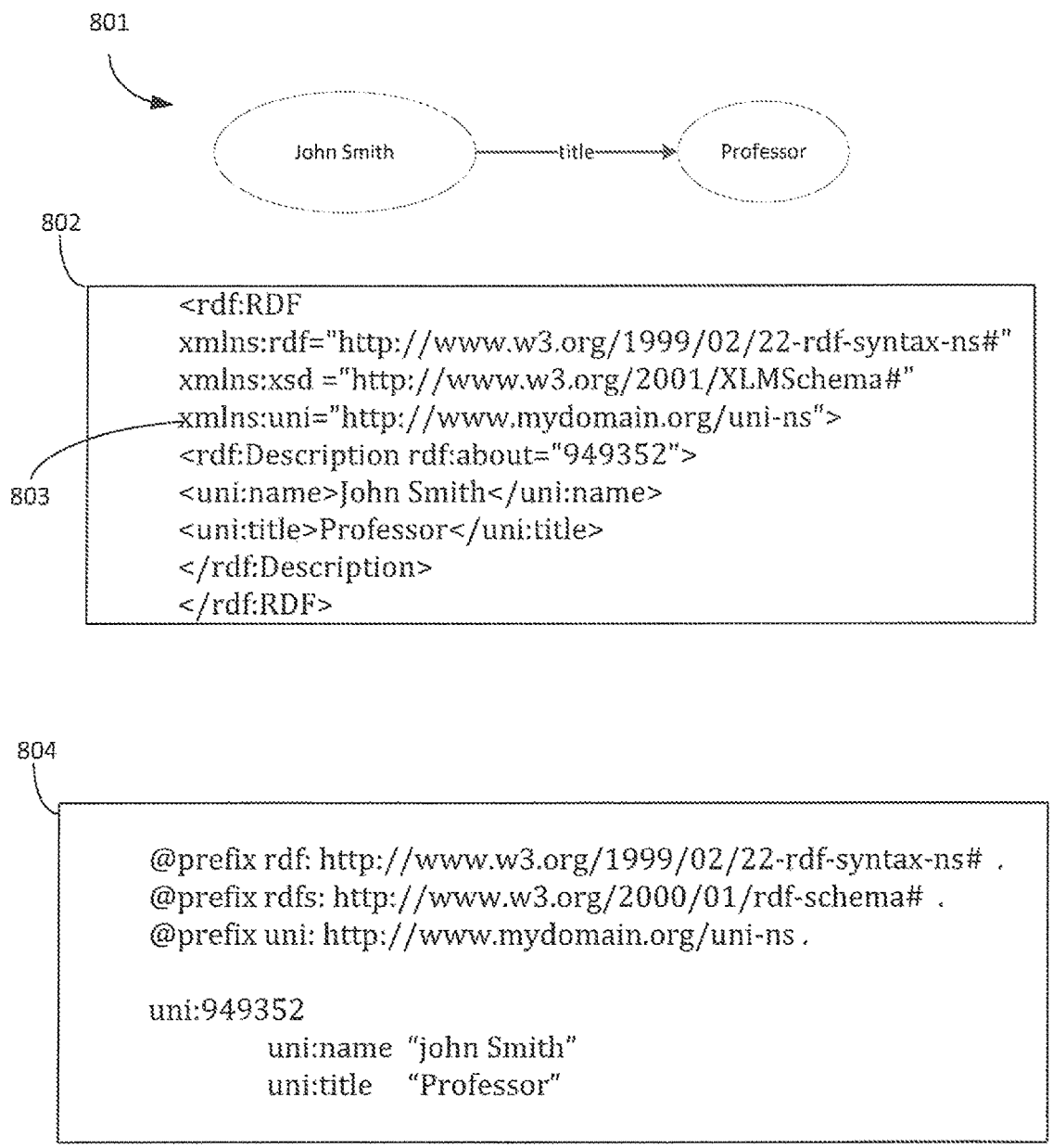
FIG. 1 illustrates a semantics example with use of RDF.
Figures 2, 3:
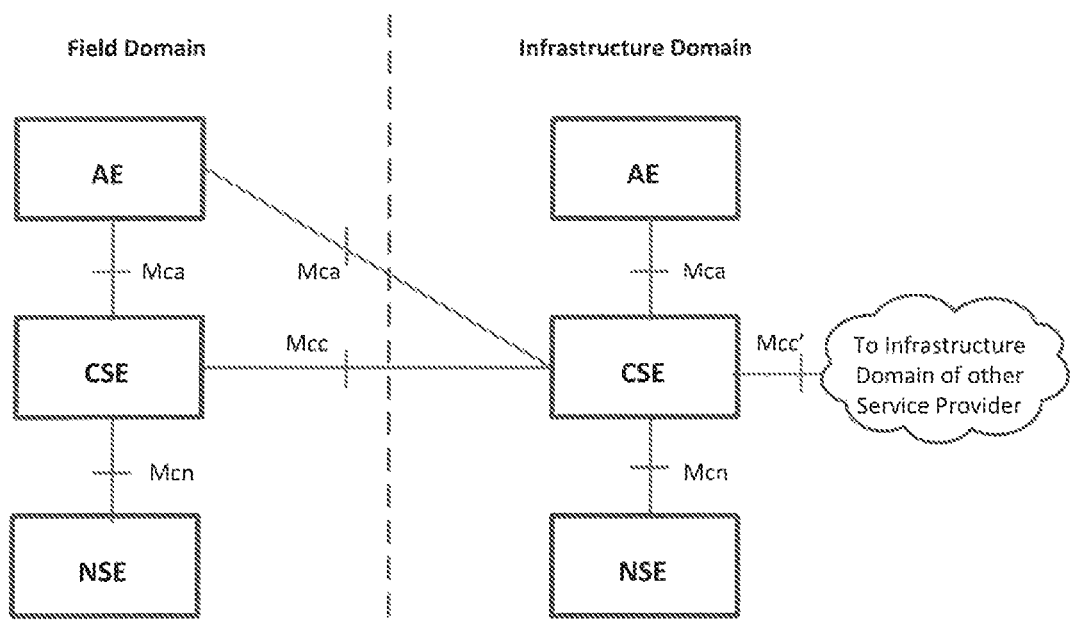
FIG. 2 illustrates an example of owl:intersection.
FIG. 3 illustrates an exemplary oneM2M Architecture.
Figure 4:
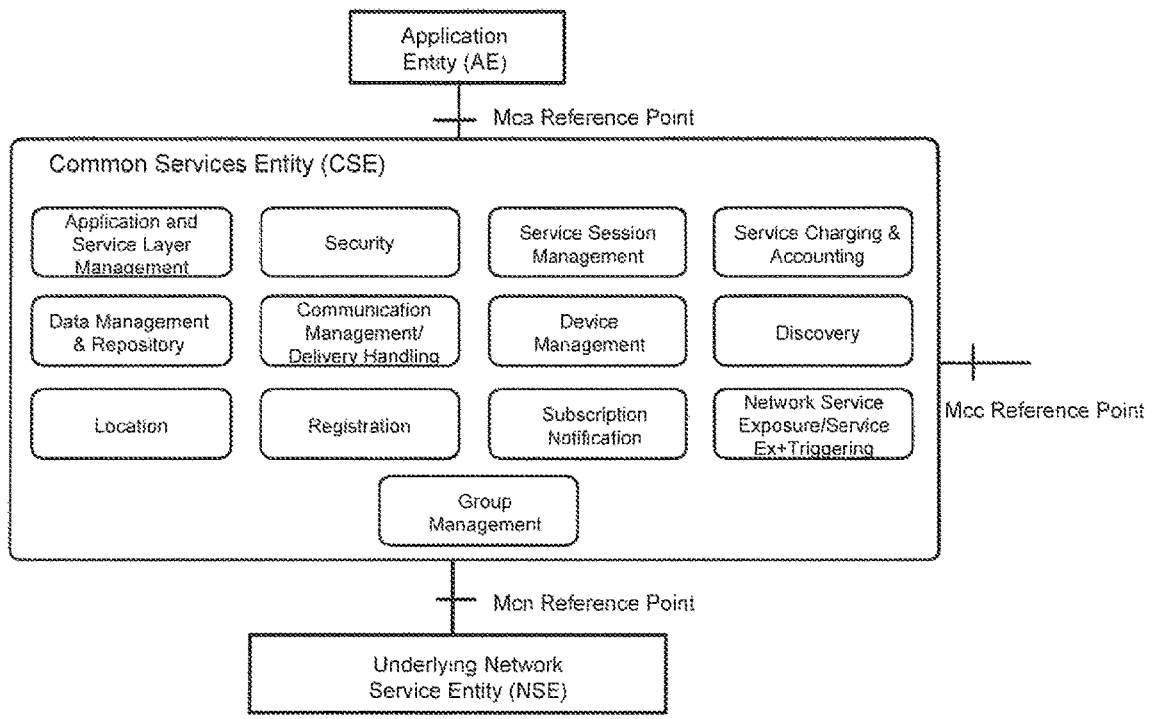
FIG. 4 illustrates exemplary oneM2M Common Service Functions.
Figure 5:
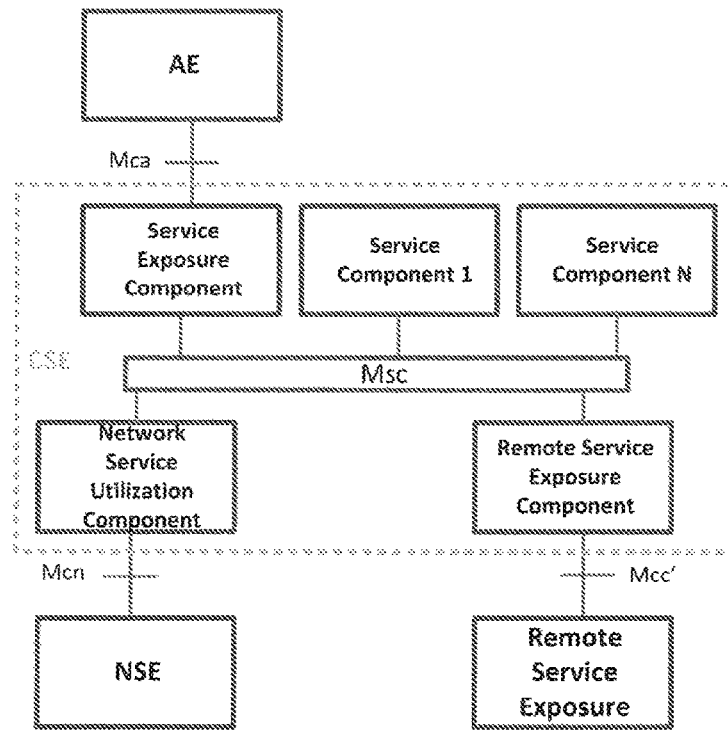
FIG. 5 illustrates an exemplary oneM2M Services Architecture.

In conventional machine-to-machine (M2M) systems, M2M applications (hosted on end devices as well as back-end network servers) need to agree beforehand on a common definition of exchanged data. This is primarily due to a lack of semantic aware M2M service layers that are able to parse, interpret or process M2M data on behalf of applications. In conventional M2M systems, M2M service layers lack semantic awareness capabilities and hence data flowing through or stored within M2M service layers is treated as opaque information.

This lack of semantic awareness prevents M2M service layers from offering services which allow data produced by M2M applications to be effectively abstracted or virtualized by the M2M service layer such that it can be discovered, accessed, interpreted, and shared by different applications even if they do not have any prior knowledge of the application from which the data originated. As a result, the physical entities that are sensed and acted upon (e.g., appliances, people, cars, rooms of a building, etc.) may not be effectively virtualized/abstracted by M2M service layers and the physical entities are treated as generic entities, intrinsic to the environment, and not tied to a specific M2M application. In order to overcome this limitation, the data transmitted in M2M systems may be associated and integrated with semantic information, such that semantic aware M2M service layers can have the same knowledge of the data as M2M applications. In doing so, M2M service layers can better facilitate the sharing of data across applications and provide value-added semantic aware services to M2M applications (e.g., data aggregation, data sharing amongst different applications, etc.).

For example, in a patient monitoring application, there could be separate applications hosted on each of the wireless sensor devices that monitor a patient's vital signs (e.g., blood pressure, temperature, oxygen, heart rate, etc.). Likewise, there could be separate applications hosted in the network that could make use of this information (e.g., applications associated with a patient's doctor, personal trainer, family members, ambulance paramedics, etc.). However, without M2M semantic aware services data from each of the wireless sensor devices, network applications may have difficulty discovering, sharing, and understanding the information from device applications unless the network applications have prior knowledge of the applications hosted on the wireless sensor devices and the type of information they produce (e.g., the location/address, units of the data, context of the data, etc.).

Disclosed herein are methods, systems, and devices that may be used for annotating and storing "semantics of normal resources" (hereinafter resource semantics). These methods, systems, and devices may be a part of a functional architecture for semantics support and allow for semantics based query. Also discussed herein are methods, systems, and devices for using a semantics child resource to help represent semantics information. "Resources" with no descriptive adjective are the same as "normal resources" as discussed herein. A "normal resource" or "resource" is resource that is stored in the resource repository, such as the resource tree in oneM2M as shown under resource type in column 1 in Table 1 below (e.g. AE, container, contentInstance, etc.)

Below is additional context according to the oneM2M RESTful architecture. Capability service functions (CSFs) are represented as a set of "resources." A resource is a uniquely addressable entity in the oneM2M architecture. A resource has a representation that may be manipulated and transferred via RESTful methods such as Create, Retrieve, Update, and Delete (CRUD) and is addressed using a uniform resource identifier (URI). A resource may contain child resource(s) and attribute(s). A child resource is a resource that has a containment relationship with a parent resource. The parent resource representation contains references to its child resources(s). The lifetime of a child-resource may be limited by the parent's resource lifetime. Each resource may support a set of "attributes" that store information of the resource.

Table 1 provides examples of resource types and related child or parent resource types defined as discussed in oneM2M-TS-0001 oneM2M Functional Architecture-V-1.1.0.

TABLE 1

Resource Summary

| Resource Type | Child Resource Types | Parent Resource Types |
| --- | --- | --- |
| activeCmdhPolicy | None | CSEBase |
| accessControlPolicy | subscription | AE, remoteCSE, CSEBase |
| contentInstance | subscription | container |
| AE | subscription, container, group, accessControlPolicy, mgmtObj, commCapabilities, pollingChannel | remoteCSE, CSEBase |
| cmdhBuffer | subscription | cmdhPolicy |
| cmdhDefaults | cmdhDefEcValue, cmdhEcDefParamValues, subscription | cmdhPolicy |
| cmdhEcDefParamValues | subscription | cmdhDefaults |
| cmdhDefEcValue | subscription | cmdhDefaults |
| cmdhLimits | subscription | cmdhPolicy |
| cmdhNetworkAccessRules | cmdhNwAccessRule subscription | cmdhPolicy |
| cmdhNwAccessRule | schedule subscription | cmdhNetworkAccessRules |
| cmdhPolicy | cmdhDefaults, cmdhLimits, cmdhNetworkAccessRules, cmdhBuffer subscription | CSEBase |
| container | container, contentInstance, subscription, | application, container, remoteCSE, CSEBase |
| CSEBase | remoteCSE, node, application, container, group, accessControlPolicy, subscription, mgmtObj, mgmtCmd, locationPolicy, statsConfig | None |
| delivery | subscription | CSEBase |
| eventConfig | subscription | statsConfig |
| execInstance | subscription | mgmtCmd |
| group | fanOutPoint subscription | Application, remoteCSE, CSEBase |
| locationPolicy | subscription | CSEBase |
| fanOutPoint | None | group |
| mgmtCmd | execInstance subscription | CSEBase |
| mgmtObj | parameters subscription | remoteCSE, CSEBase |
| m2mServiceSubscription | nodeInfo subscription | None documented |
| node | schedule, mgmtObj subscription | CSEBase, remoteCSE |
| nodeInfo | subscription | m2mServiceSubscription |
| parameters | parameters subscription | mgmtObj, parameters |
| pollingChannel | None | remoteCSE, application |
| remoteCSE | application, container, group, accessControlPolicy, subscription, mgmtObj, pollingChannel, node | CSEBase |
| request | subscription | CSEBase |
| schedule | subscription | node, subscription, cmdhNwAccessRule |
| statsCollect | subscription | CSEBase (in IN-CSE) |
| statsConfig | eventConfig subscription | CSEBase (in IN-CSE) |
| subscription | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, |

TABLE 1-continued

| Resource Summary | | |
|---|---|---|
| Resource Type | Child Resource Types | Parent Resource Types |
| | | parameters, remoteCSE, request, schedule, statsCollect, statsConfig |

Resource discovery procedures allow discovering of resources residing on a CSE. The use of the filterCriteria parameter allows limiting the scope of the results. Resource discovery may be accomplished using the RETRIEVE method by an Originator which also includes the root of where the discovery begins (e.g., <CSEBase>). The unfiltered result of the resource discovery procedure includes the child resources under the root of where the discovery begins, which the Originator (e.g., discover request sender) has a Discover access right on. Discover access right is that the requester/request sender has the access right to discover resources on that CSE.

Filter criteria conditions may be provided as parameters to the RETRIEVE method. The filter criteria conditions describe the rules for resource discovery (e.g. resource types, creation time, or matching string). The filter criteria can also contain the parameters for specifying the maximum size of the answer (upper limit), and/or sorting criteria for specifying in which order the searching result should be organized. Table 2 describes filterCriteria parameter, which is discussed in more detail below with regard to semantics annotation.

TABLE 2

| filterCriteria conditions | | |
|---|---|---|
| Condition tag | Multiplicity | Matching condition |
| createdBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| stateTagSmaller | 0 . . . 1 | The stateTag attribute of the resource is smaller than the specified value. |
| stateTagBigger | 0 . . . 1 | The stateTag attribute of the resource is bigger than the specified value. |
| expireBefore | 0 . . . 1 | The expirationTime attribute of the resource is chronologically before the specified value. |
| expireAfter | 0 . . . 1 | The expiration Time attribute of the resource is chronologically after the specified value. |
| labels | 0 . . . n | The labels attributes of the resource matches the specified value. |
| resourceType | 0 . . . n | The resourceType attribute of the resource is the same as the specified value. It also allows discriminating between normal and announced resources. |
| sizeAbove | 0 . . . 1 | The contentSize attribute of the <contentInstance> resource is equal to or greater than the specified value. |
| sizeBelow | 0 . . . 1 | The contentSize attribute of the <contentInstance> resource is smaller than the specified value. |
| contentType | 0 . . . n | The typeOfContent attribute of the <contentInstance> resource matches the specified value. |
| limit | 0 . . . 1 | Limitation the number of matching resources to the specified value. |
| attribute | 0 . . . n | This is an attribute of resource types. Therefore, a real tag name is variable and depends on its usage. E.g., creator of container resource type can be used as a filter criteria tag as "creator = Sam". |
| filterUsage | 0 . . . 1 | Indicates how the filter criteria are used. E.g., if this parameter is not provided, the Retrieve operation is for generic retrieve operation. If filterUsage is provided, the Retrieve operation is for resource <discovery> (clause 10.2.6). |

A match happens when a resource matches the configured filter criteria conditions and Originator has a Discover access right on the resource. A successful response can contain a list for the matched resources.

Figure 6:
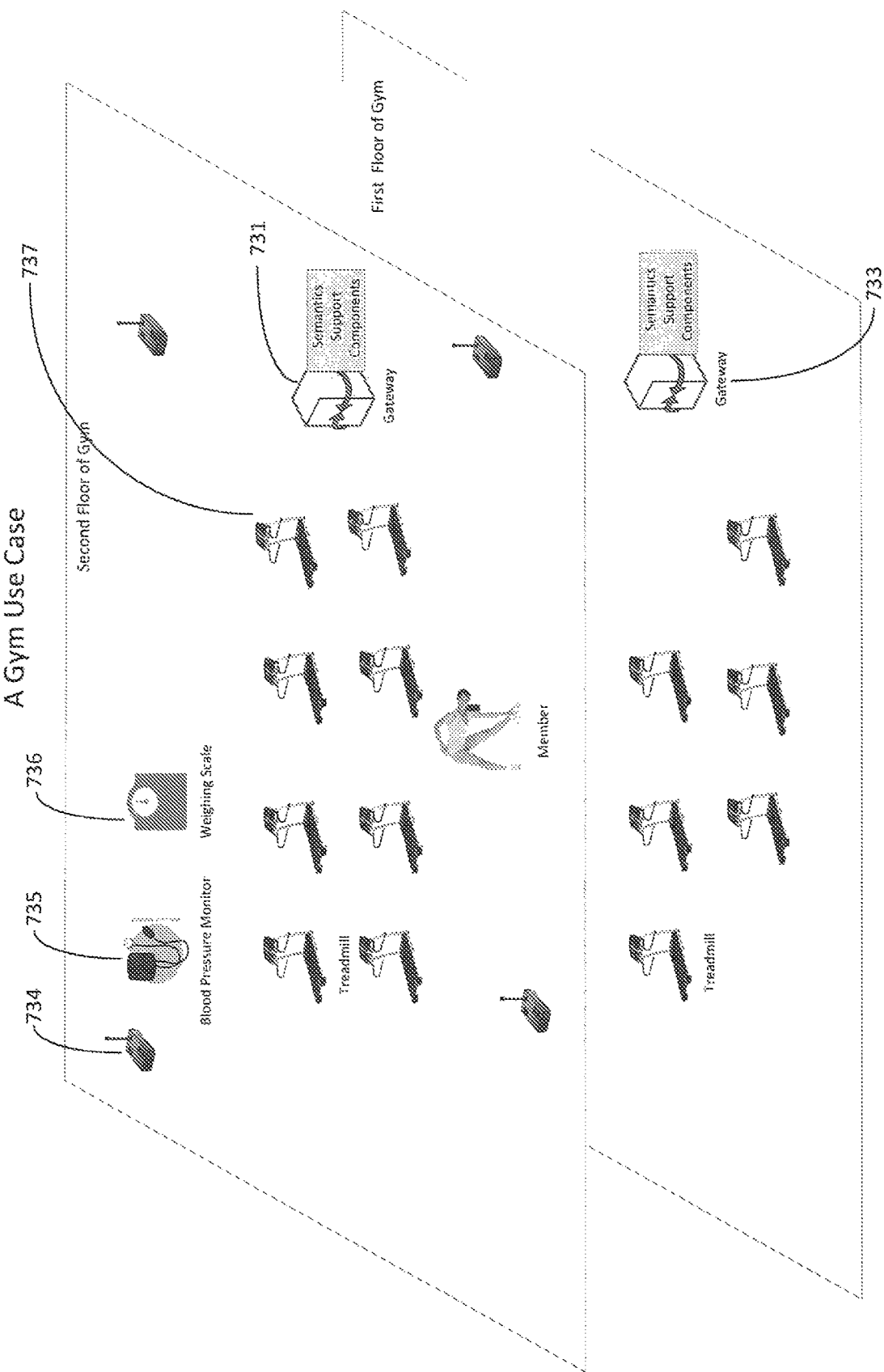
FIG. 6 illustrates a use case in the context of a gym.

FIG. 6 illustrates a use case in the context of a gym. In the use case of a gym as shown in FIG. 6, there are different devices deployed on both floors of the gym, e.g. ambient sensor 734 for sensing the surrounding temperature/humidity etc., treadmill 737 for gym users to work out, weighing scale 736, and blood pressure monitor 735 for gym users to keep track of their vitals. In some deployments each device may register with the gateway located on the same floor (e.g., gateway 731 or gateway 733) or some other type of association. The resources that are relevant to each device (e.g., application resource) and the data resources that are produced and reported by each device may be stored in a resource repository. The functions of semantics support can be hosted on one or more gateways, such as gateway 731 or gateway 733.

The conventional M2M service layer mechanisms (e.g., defined in oneM2M-TS-0001 oneM2M Functional Architecture-V-1.1.0) allow the resource discovery based on the filter criteria described in Table 2. However, more advanced resource query may be desired. In the gym use case, a gym user may want to discover treadmill 737 with the particular make, year, and availability in a certain time frame. The conventional discovery mechanism may not be able to achieve such advanced resource query. But semantics-based query, as disclosed herein, can provide a set of analytic query operations for data whose schema is part of the data. In order to realize semantics-based query, resource semantics are annotated. In the context of this disclosure, semantics annotation can be defined as adding and representing resource's semantics that could be made available for query and other advanced operations. The semantic repository may be considered a centralized location particularly for semantics and not necessarily resources. The relationship and value information may be stored with a resource in its semantics child resource, so this information may be extracted and put in the semantic repository. Semantics annotation instances are stored in a semantics repository, which contain a set of triples. Resource semantics are stored in the semantics child resource of a resource.

Figure 7:
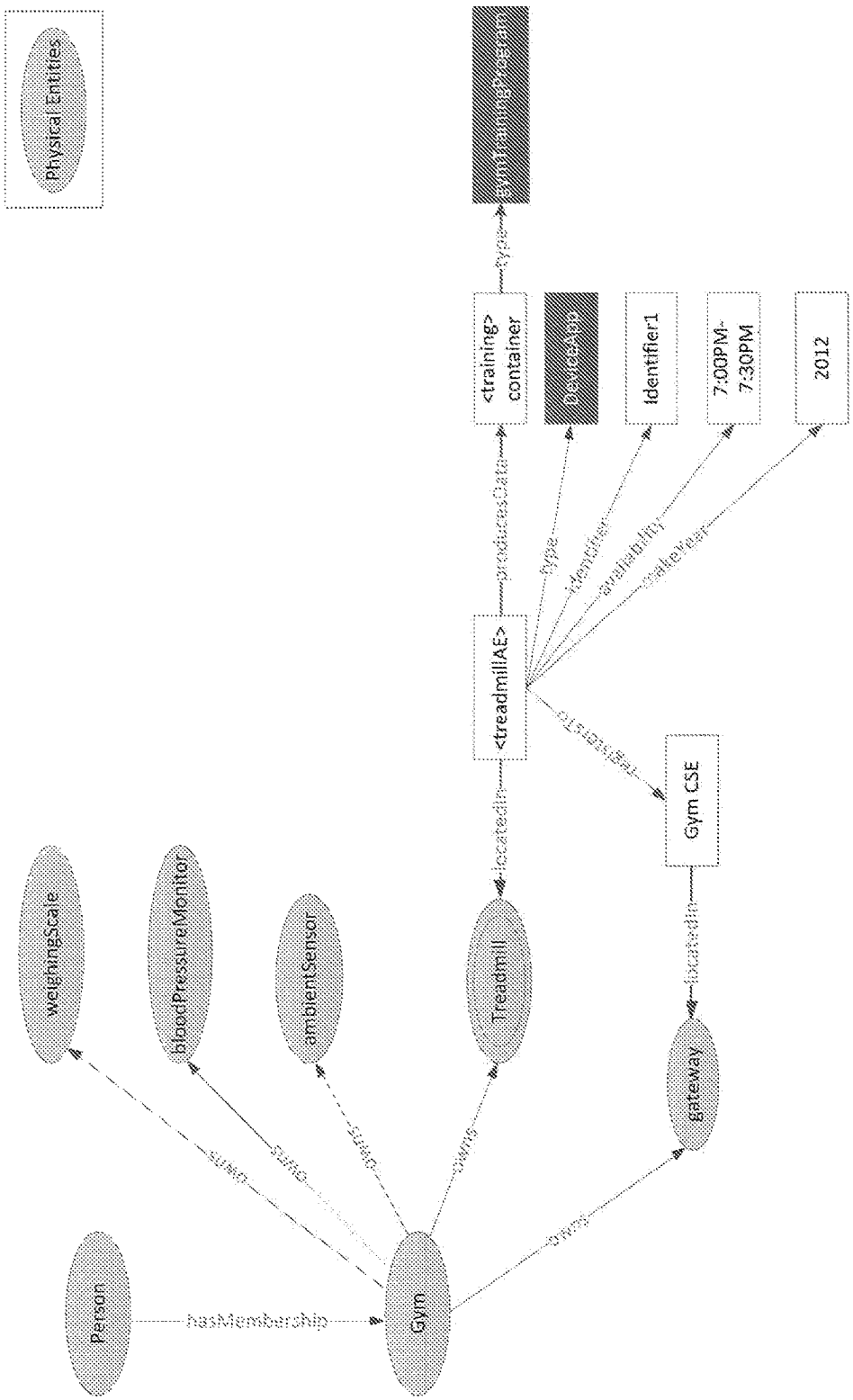
FIG. 7 illustrates semantics information represented in graph for gym use case.

FIG. 7 illustrates an exemplary abstraction associated with the gym use case of FIG. 6. The semantics of a resource can be described by a resource-relationship-value triple, consisting of a resource, a relationship, and a value. Values can be classes or other resources. A class represents a set of normal resources. A class can be identified by URI/URL. A class composes an ontology. A relationship describes relations between resources, for example "created by", "lifetime", "subscribed by" and so on. A relationship can be identified by URI/URL. It is one of fundamentals that compose an ontology. The examples of resource-relationship-value triples in the gym use case shown in FIG. 7 are listed in Table 3. For example from Table 3, resource=<treadmillAE>, relationship=locatedIn, and value=treadmill. The treamdmillAE is registered to CSE from the treadmill device. This triple is indicated in the registration, and is not represented in semantics child resource. So FIG. 22 does not contain this triple. The physical entities are a person, a gym, or deployed devices (e.g., gateway, treadmill, ambient sensor, blood pressure monitor, or weight scale). In the gym, gateway 731 and gateway 732 may host the gym common service entity (CSE). In other words, the gateway is abstracted to the gym CSE. Similarly, the treadmill is abstracted to the treadmillAE. Entities in FIG. 7 may utilize the resource types defined in oneM2M.

TABLE 3

Gym Resource-Relationship-Value Triples
Gym owns treadmill

<treadmillAE> locatedin treadmill
<treadmillAE> producesData <training> container TABLE 3-continued Gym Resource-Relationship-Value Triples
Gym owns treadmill <treadmillAE> type DeviceApp
<treadmillAE> identifier Identifier1
<treadmillAE> availability 7:00PM-7:30 PM
<treadmillAE> makeYear 2012

Figure 8:
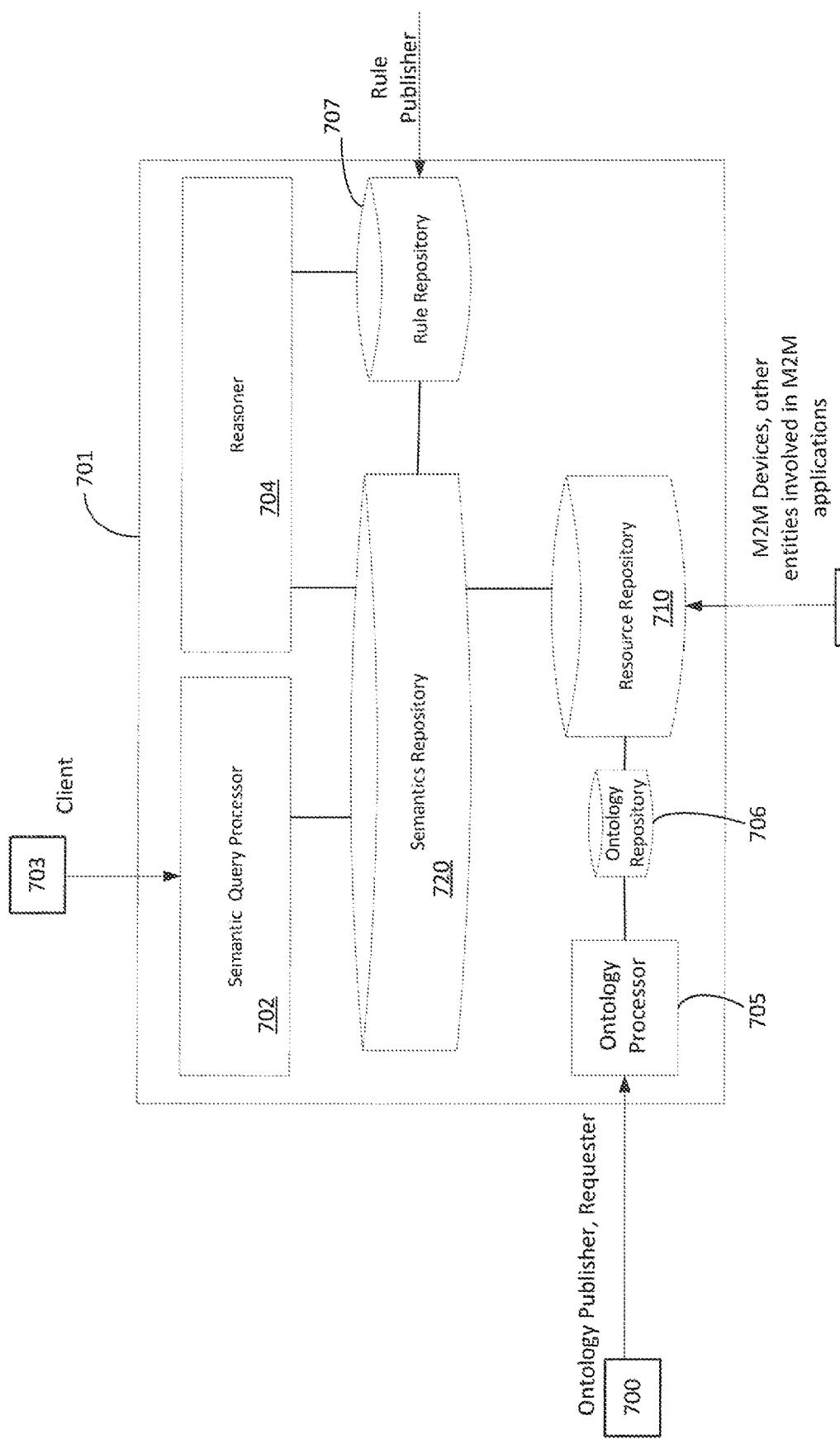
FIG. 8 illustrates an exemplary functional architecture of M2M semantic support.

Below is a review of a functional architecture for M2M semantics support, as well as details with regard to the implementation of semantics annotation. FIG. 8 illustrates an exemplary functional architecture for M2M semantic support. Components of the exemplary semantic architecture in block 701, which are discussed in more detail below, may functionally include resource repository 710, ontology processor 705, ontology repository 706, semantics repository 720, rule repository 707, reasoner 704, or semantics query processor 702. Block 701 or its components may be a standalone device (e.g., a device that has a primary semantic function) or integrated into another device (e.g., gateway 731). Block 701 may be communicatively connected with a client device 703, an ontology publishing (or requesting) device 700, or another device 708 that has or otherwise interacts with M2M applications.

Resource repository 710 stores the resources that are collected from M2M devices and any resources that are relevant to the M2M applications, such as profiles associated with persons, devices, etc. involved in the M2M applications (normal resources). The M2M semantic support may enable semantics to the resources for universal understanding/interpretation of them, as well as any advanced processing on resources (e.g. semantic query, data analytics, etc.).

The ontology processor 705 is in charge of processing, classifying, storing, and providing discovery function of published or generated ontologies external and internal of a M2M domain. Ontology repository 706 stores the ontologies, which are composed of fundamentals of classes and relationships. Those ontologies can be used for normal resources to enable semantics. Ontology repository may be considered another term for semantics node. A domain may be considered an identity space that scopes the identities. An identifier may be unique even if it looks same in different spaces. In the context of this disclosure, a domain may be used to scope the classes and relationships defined by different entities such as different verticals, applications etc. such that their definitions will be unique in the same domain even if their names may look the same in different domains.

Semantics repository 720 stores the annotated semantics information in certain representations, which may have the option of utilizing RDF.

Rule repository 707 stores the rules that are used to represent new knowledge that often goes beyond the existing semantics that is associated with the resources in resource repository 710. Rules are typically conditional statements (e.g., if-then clauses).

Reasoner 704 takes input from the rule repository 710 and the existing resource semantics information in the semantics repository 720 and generates new resource semantics information if the conditions in the rules are satisfied. New resource semantics information is added to the semantics repository 720.

Semantic query processor 702 handles the queries from clients to search over the resource semantics information stored in semantics repository 720 and may return the result to client device 703. A client may send semantics annotation request or semantics annotation instance discovery request to SAP in the context of this disclosure.

Figure 9:
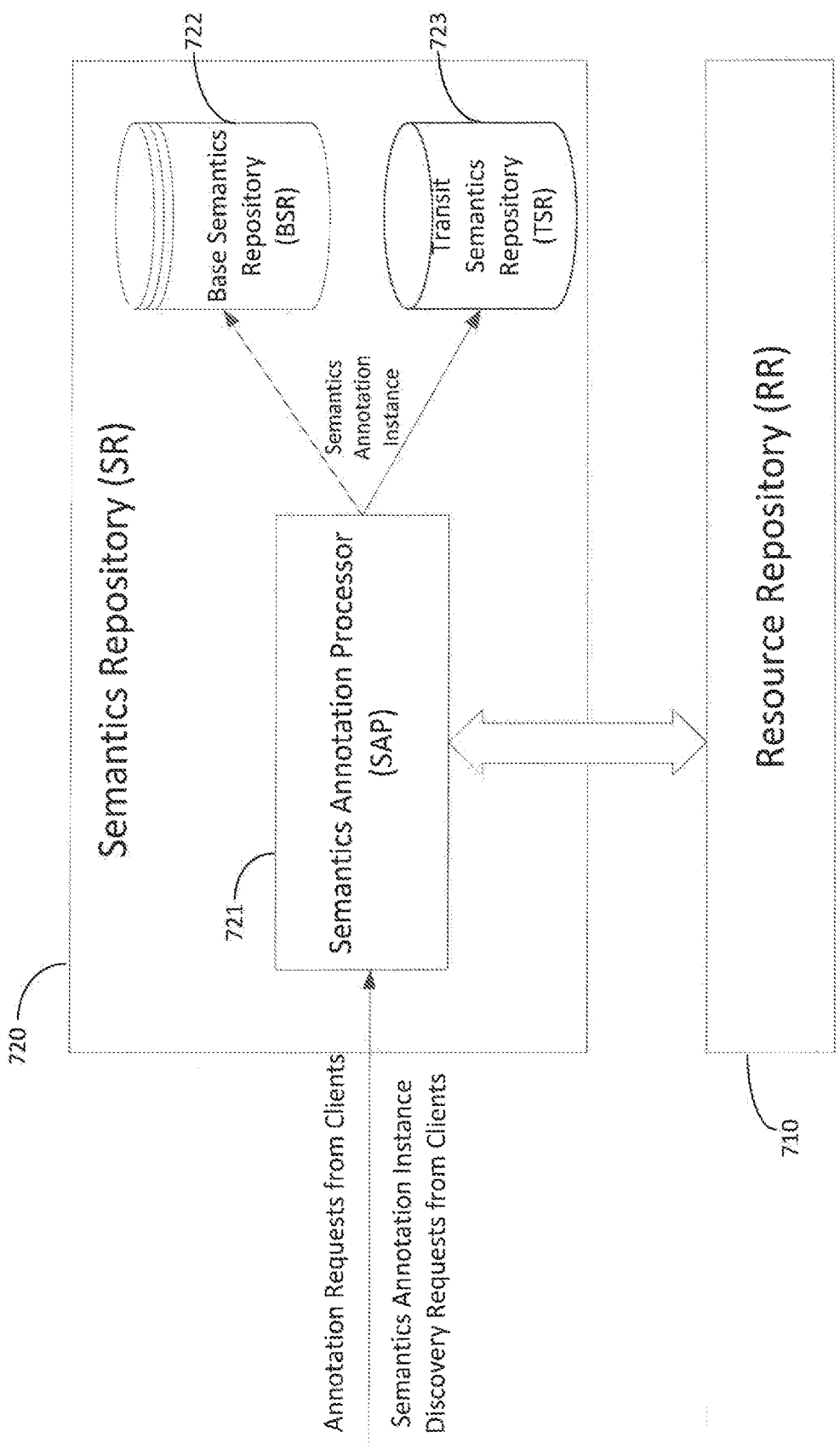
FIG. 9 illustrates an exemplary architecture of semantics repository.

FIG. 9 illustrates an exemplary functional architecture for semantics annotation. Semantics annotation may result in triples, which in an example are composed of URI of resources from resource repository (RR) 710 and the relationship-value doubles in its corresponding semantics child resource. The set of triples is stored in semantics repository 720, which is called a semantics annotation instance. As shown in FIG. 9, semantics repository 720 may consist of semantics annotation processor (SAP) 721, base semantics repository (BSR) 722, and transit semantics repository (TSR) 723, which will be discussed in more details herein. Each semantics annotation instance corresponds with a list of resources whose semantics information is contained in the semantics annotation instance. Each semantics annotation instance may have an identifier (e.g., a code that may be alphabetic, numeric, or alphanumeric) associated with it.

Semantics repository 720 and resource repository 710 do not need to be physically separate. They may be functionally different, because they can store different information. Resource repository 710 stores resources, while semantics repository 720 may store the triples associated with resources contained in the resource repository 710. From the implementation perspective, resource repository 710 may be implemented as relational database. Semantics repository 720 may be implemented as a triple store or a graph store, among other things. Semantics repository 720 can leverage conventional triple store implementations, such as Jena or Sesame, to store semantics annotation instances.

SAP 721 may have multiple responsibilities including generating or updating semantics annotation instances. In a first scenario, SAP 721 may generate semantics annotation instances automatically for each resource in resource repository 710. In a second scenario, SAP 721 may generate semantics annotation instances based on semantics annotation requests from client 703 (FIG. 8), or another device. SAP 721 may determine which resources to annotate from resource repository 710 based on which layer in the resource hierarchy it is performing annotation on (hierarchy is discussed in more detail below), based on instruction in a request or type of request from client 703, or based on the type of device a request is sourced from, among other things.

Figure 10:
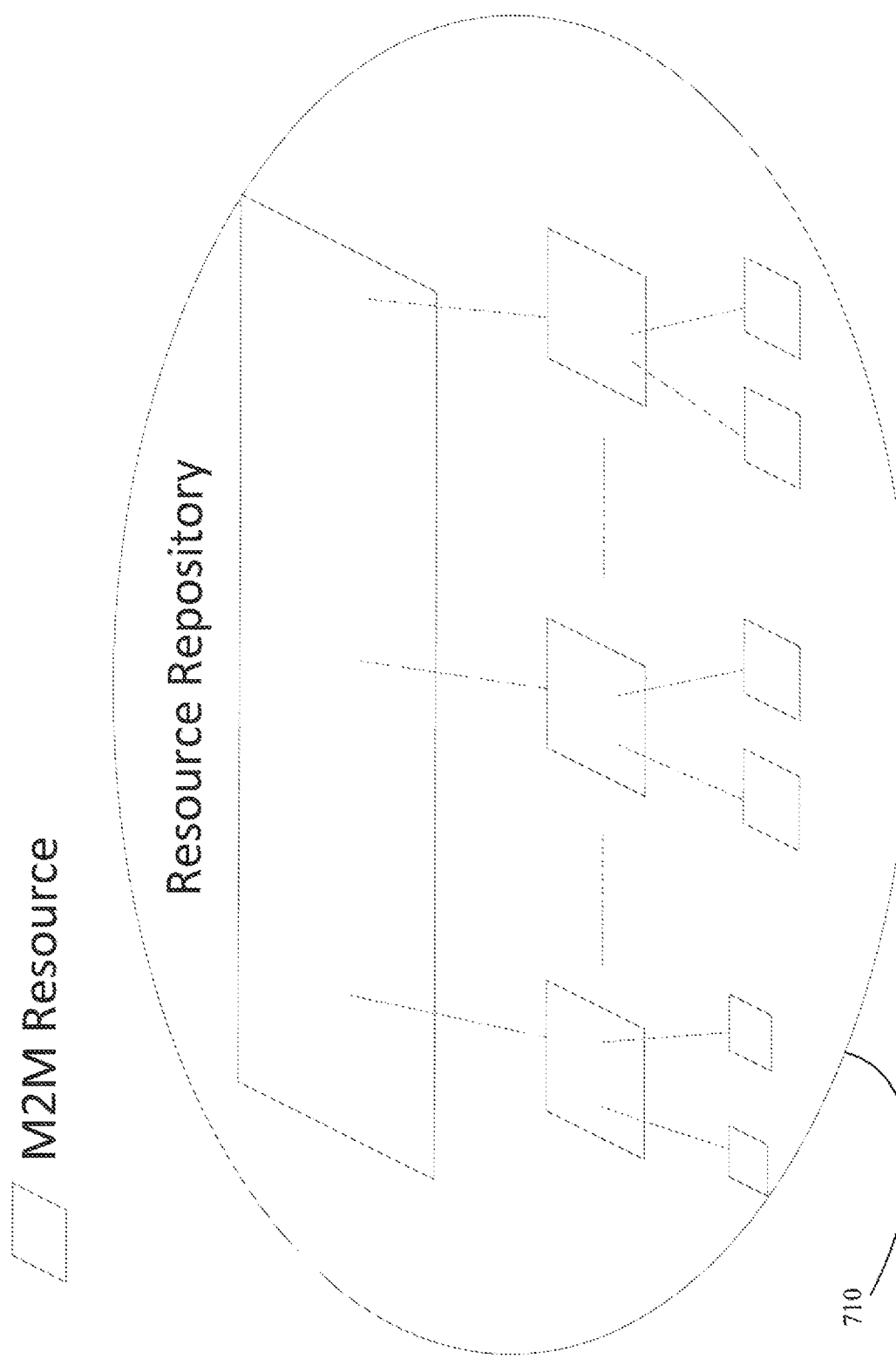
FIG. 10 illustrates an exemplary M2M resource hierarchy.

A semantic annotation instance is associated with the resources whose semantics in Resource-Relationship-Value triples are contained in this semantics annotation instances. SAP 721 maintains the semantics annotation instance to resource association form, as shown in Table 4. Thus each semantics annotation instance is mapped to the URIs of the resources of resource repository 710. Resource repository 710, as shown in FIG. 10, may store M2M resources in a hierarchical manner, which may be associated with parent and child resources as discussed with regard to Table 1. This hierarchical structure may allow for situations where the "contained resource" field of Table 4 does not need to list the URIs of all resources whose resource-relationship-value triples or the like are contained in the semantics annotation instance. If some of the resources are under the same hierarchy and they are the only resources under that hierarchy, the parent URI of the hierarchy can be used to represent those resources. In other words, a parent URI may be specified to be associated with the semantics annotation instance, if all its child resources are annotated in the same instance. As an example: if a container has and only has two content instances, e.g. with the URIs of /<container>/<inst1>, /<container>/<inst2>. If those two resources are described in a semantics annotation instance, then its corresponding contained resource field can be written as /<container>/, instead of the two individual URIs.

TABLE 4

Semantics Annotation Instance to Resource Association Form

| Semantics Annotation Instance | Contained Resources |
|---|---|
| Identifier of semantics annotation instance | URIs of resources |

TABLE 5

Resource to Semantics Annotation Instance Association Form

| Resource | Semantics Annotation Instance |
|---|---|
| URI of Resource | Identifiers of relevant semantics annotation instances |

SAP 721 may also maintain an inverse association form (resource to semantics annotation instance association form), as shown in Table 5. The use of the form of Table 5 may allow SAP 721 to find the relevant semantics annotation instances and periodically update the relevant semantics annotation instances when a resource's semantics information changes. Instead of a notification of a change being sent immediately, information with regard to one or more changes (e.g., a cumulative update) may be periodically sent. For example, SAP 721 can periodically (e.g., every 1 minute, 1 day, or 1 week—depending on type of implementation) notify resource repository 710 of the resource to semantics annotation instance association. Also SAP 721 can notify resource repository 710 of the resource to semantics annotation instance association when the association relationship is created, updated, or deleted. In an example, resource repository 710 may have the aforementioned association relationship stored with the resource itself via an attribute for resources in oneM2M with semantics annotation, such as annotationInst attribute (discussed in more detail herein).

Figure 11:
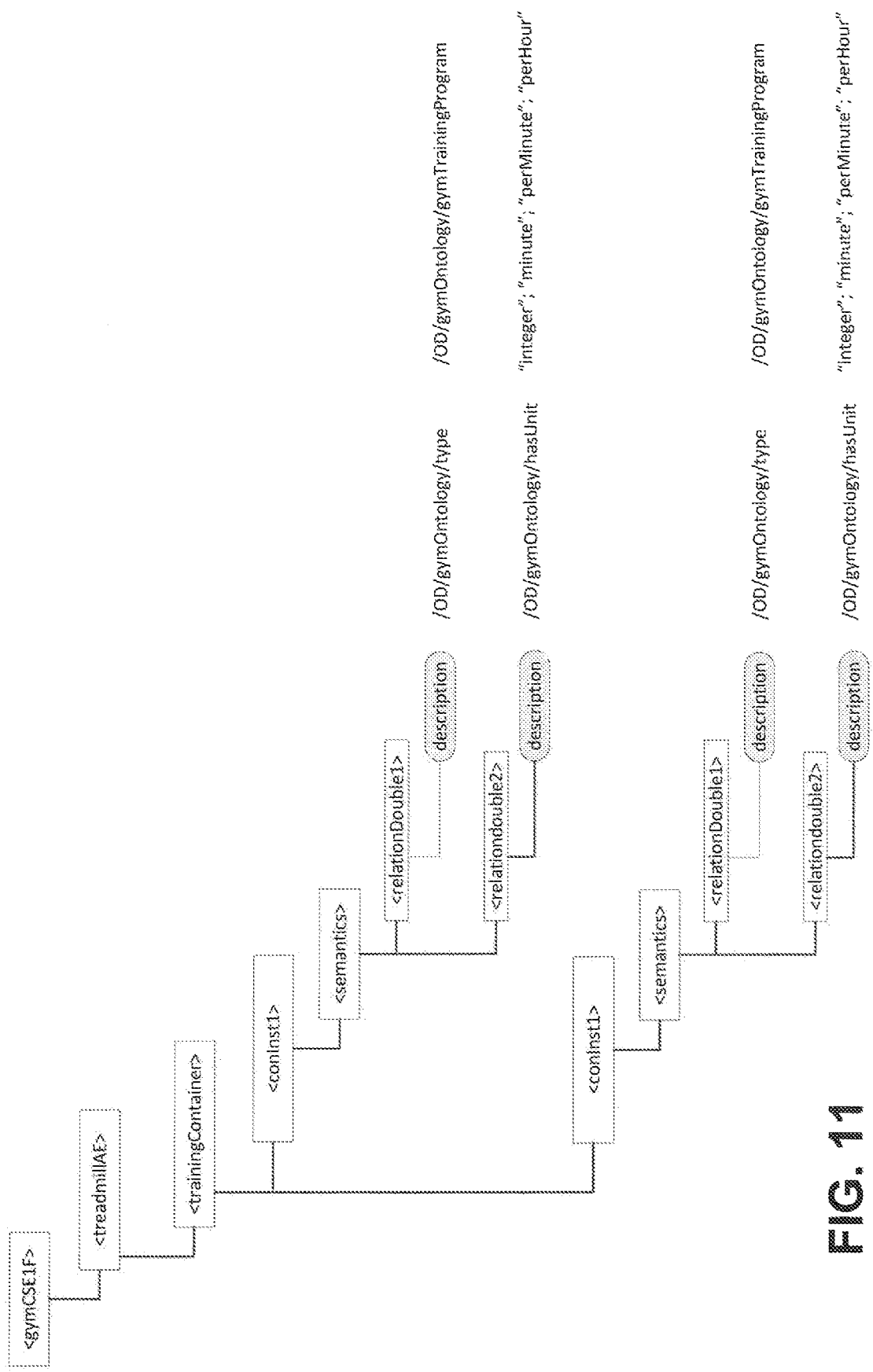
FIG. 11 illustrates example of semantics child resource in gym use case.

To further illustrate the use of Table 4 and Table 5, FIG. 11 is now referred to. Here, assume the identifier of the semantics annotation instance is treadmillAnnotation, which contains the triples of the following resources:

/gymCSE1F/treadmillAE/trainingContainer/contInst1; and

/gymCSE1F/treadmillAE/trainingContainer/contInst2.

Then the semantics annotation instance to resource association form will have a semantics annotation instance entry added as shown in Table 6 (related to Table 4). The resource to semantics annotation instance association form will have two entries added for each of the resources as shown in Table 7 (related to Table 5). Table 6 may be simplified because the resources have the same semantics doubles as shown in FIG. 11. Table 6 is simplified to what is seen in Table 8. Table 7 remains the same.

TABLE 6

Semantics Annotation Instance to Resource Association Form

| Semantics Annotation Instance | Contained Resources |
|---|---|
| treadmillAnnotation | /gymCSE1F/treadmillAE/trainingContainer/contInst1 /gymCSE1F/treadmillAE/trainingContainer/contInst2 |

TABLE 7

Resource to Semantics Annotation Instance Association Form

| Resource | Semantics Annotation Instance |
|---|---|
| /gymCSE1F/treadmillAE/trainingContainer/contInst1 | treadmillAnnotation |
| /gymCSE1F/treadmillAE/trainingContainer/contInst2 | treadmillAnnotation |

TABLE 8

Semantics Annotation Instance to Resource Association Form

| Semantics Annotation Instance | Contained Resources |
|---|---|
| treadmillAnnotation | /gymCSE1F/treadmillAE/trainingContainer/ |

Figure 12:
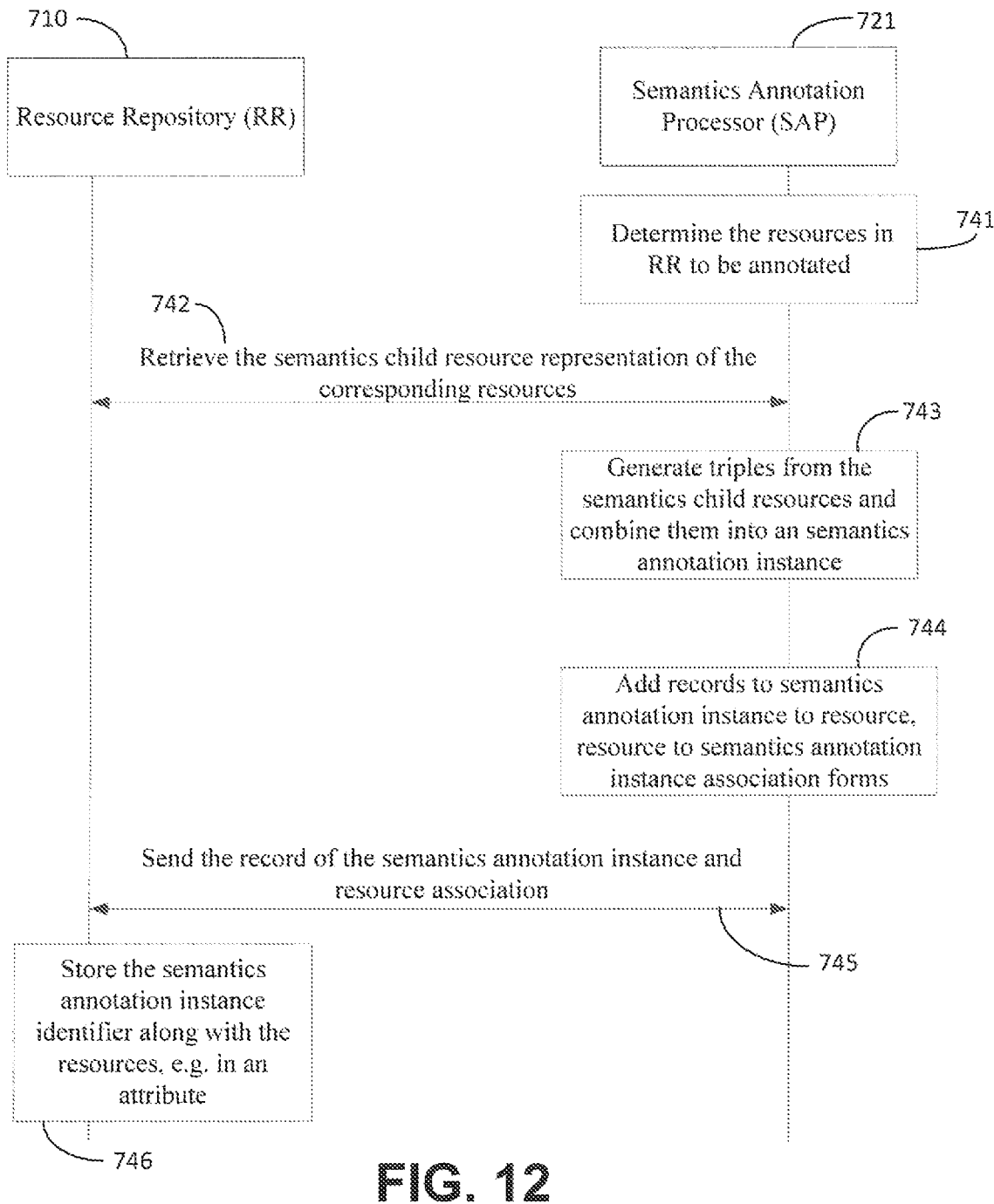
FIG. 12 illustrates an exemplary message flow of semantics annotation instance generation.

FIG. 12 is an exemplary message flow of semantics annotation instance generation. At block 741, SAP 721 determines the resources in RR 710 to be annotated. The resource may be determined based on which layer in the resource hierarchy it is performing annotation on or based on clients' requests, among other things. At block 742, SAP 721 retrieves the semantics child resource representation of the corresponding resources. At block 743, SAP 721 generates triples from the semantics child resources, which may be done according to the method for semantics annotation described herein. In addition, SAP 721 combines the generated triples into a semantics annotation instance. At block 744, SAP 721 generates the semantics annotation instance to resource association records and ads into the form shown in Table 4. SAP 721 also generates or updates the resource to semantics annotation instance association record shown in Table 5. At block 745, SAP 721 sends the record of semantics annotation instance and resource association in the format as shown in Table 4 to RR 710. At block 746, RR 710 extracts the association information from the record, and store the semantics annotation instance identifier along with the relevant resource(s), e.g., in an attribute of the resource(s).

Discussed below is the first scenario (which was discussed above) with regard to SAP 721 automatically generating one or more semantics annotation instances for each resource of resource repository 710. In this example, if resource repository 710 notifies SAP 721 that there is a new layer created in the resource hierarchy, SAP 721 may annotate semantics of all the resources under the new layer. If resources are added, deleted, or updated in an existing layer, the corresponding semantics annotation instances may be updated by SAP 721 as well. In this first scenario, resource repository 710 may have the hierarchical structure as oneM2M defines (e.g., Table 1 and FIG. 10). SAP 721 can generate semantics annotation instance for each layer. In an oneM2M resource structure implementation as discussed herein, SAP may annotate semantics of resources such as <CSEBase>, <AE>, <container>, etc. The following is an exemplary list of resources that may enable semantics information if the semantics child resource is added to them: <CSEBase>, <remoteCSE>, <AE>, <container>, <contentInstance>, <group>, and <node>.

Figure 13:
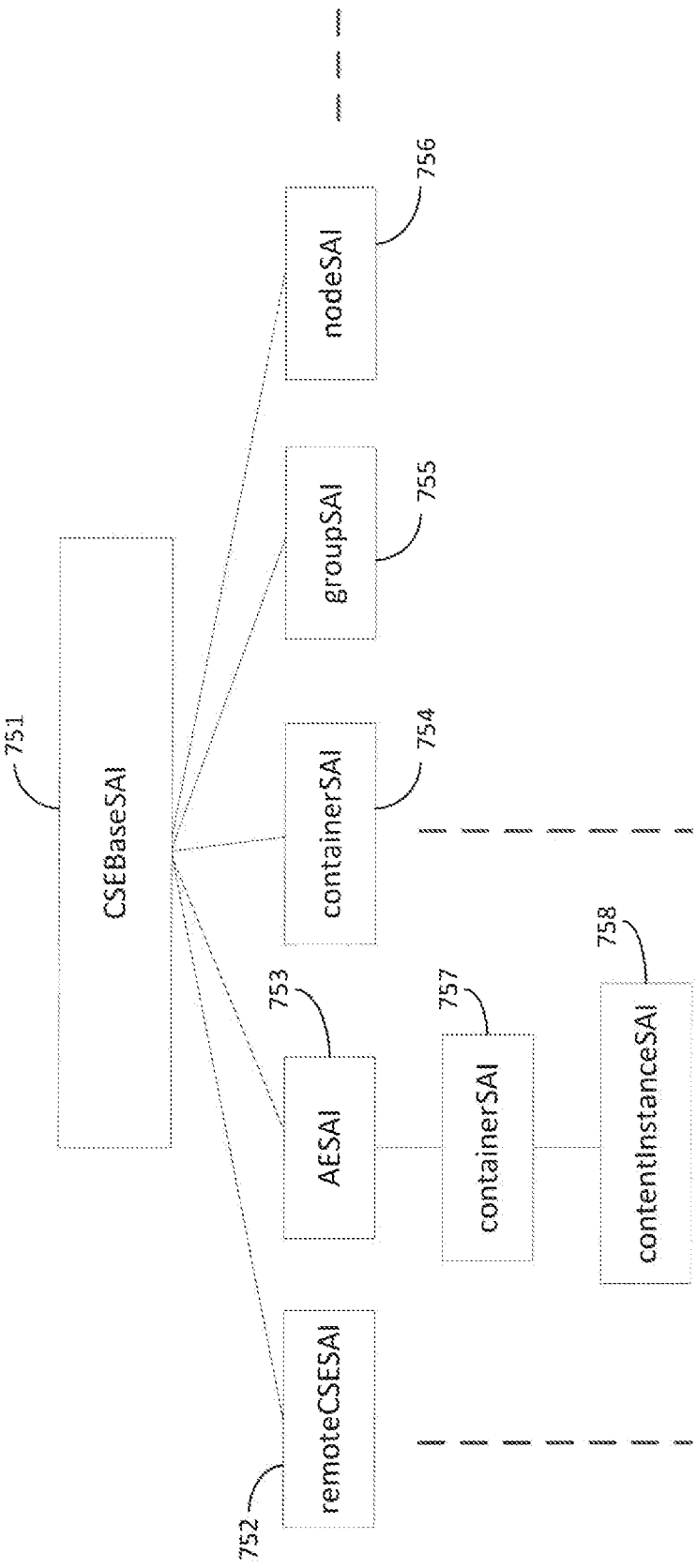
FIG. 13 illustrates an exemplary hierarchy of semantics annotation instances in BSR.

In this first scenario, the generated semantics annotation instances may be stored in BSR 722. Here the semantics annotation instances in BSR 722 inherit a similar hierarchical relationship as the corresponding resources, as provided in Table 1. FIG. 13 is an exemplary illustration of a hierarchy of semantics annotation instances on BSR 722 for the first scenario. Each semantic annotation instance may have a unique identifier in semantics repository 720. For semantic annotation instance in BSR 722, the identifier may look like the name of parent resource of a layer with some random donation. As shown in FIG. 13, the semantics annotation instance of the CSEBase layer is CSEbaseSAI 751. CSEBaseSAI 751 represents the semantics annotation instance of the CSEBase layer, similarly remoteCSESAI 752 for remoteCSE layer, AESAI 753 for AE, containerSAI 757 for container, contentinstanceSAI 758 for contentInstance containerSAI 754 for container, groupSAI 755 for group, nodeSAI 756 for node, and the like. There may be a possibility for redundant triples stored in annotation instances. For example, CSEBaseSAI can contain all the triples for the resources under CSEBase, AESAI can contain all the triples for the resources under AE which may be redundant to part of the triples stored in CSEBaseSAI. Linking CSEBaseSAI to all its sub annotation instances may save storage space on SR 720. For example, when a semantics-based query is scoped to CSEBaseSAI, all triples under CSEBaseSAI are those triples of CSEBaseSAI plus all the triples under the CSEBaseSAI layer in this hierarchy, which will be searched over. Using FIG. 28 to further illustrate the aforementioned examples, CSEBaseSAI 751 may contain all the information (triples) as shown in FIG. 28. This information can be repeated again in respective AESAI's (e.g., treadmill1, treadmill2, etc. of FIG. 28). Alternatively, links to the AESAI's may be stored in CSEBaseSAI 751 and the detailed information (triples) may be contained in the respective AESAI.

With continued reference to FIG. 13 and the first scenario, for a leaf semantics annotation instance, it contains the semantics annotation of the resource itself, since the resource does not have any child resources with semantics information. As an example, the semantics annotation instance of a <contentInstance> resource (e.g., contentInstanceSAI 758) may contain the triples of the resource itself.

For a non-leaf semantics annotation instance, it can be composed of the triples of the resource itself and the semantics annotation instance(s) for its child resources. For example with regard to FIG. 13, semantics annotation instance of <AE> is composed of the triples of the <AE> and the semantics annotation instances for <container> and <contentInstance>. In addition, for further perspective, semantics annotation instance of <container> is composed of the triples of the <container> and the semantics annotation instances for <contentInstance>.

It is understood that the entities performing the steps illustrated in FIG. 12 as well as FIG. 14, and FIG. 16 thru FIG. 20 may be logical entities. The steps may be stored in a memory of, and executing on a processor of, a device, server, or computer system, such as those illustrated in FIG. 32C or FIG. 32D. In an example, with further detail below with regard to the interaction of M2M devices, client 703 of FIG. 8 may reside on M2M terminal device 18 of FIG. 32A, while semantics repository 720 of FIG. 8 may reside on M2M gateway device 14 of FIG. 32A. FIG. 32 FIG. 32

Figure 14:
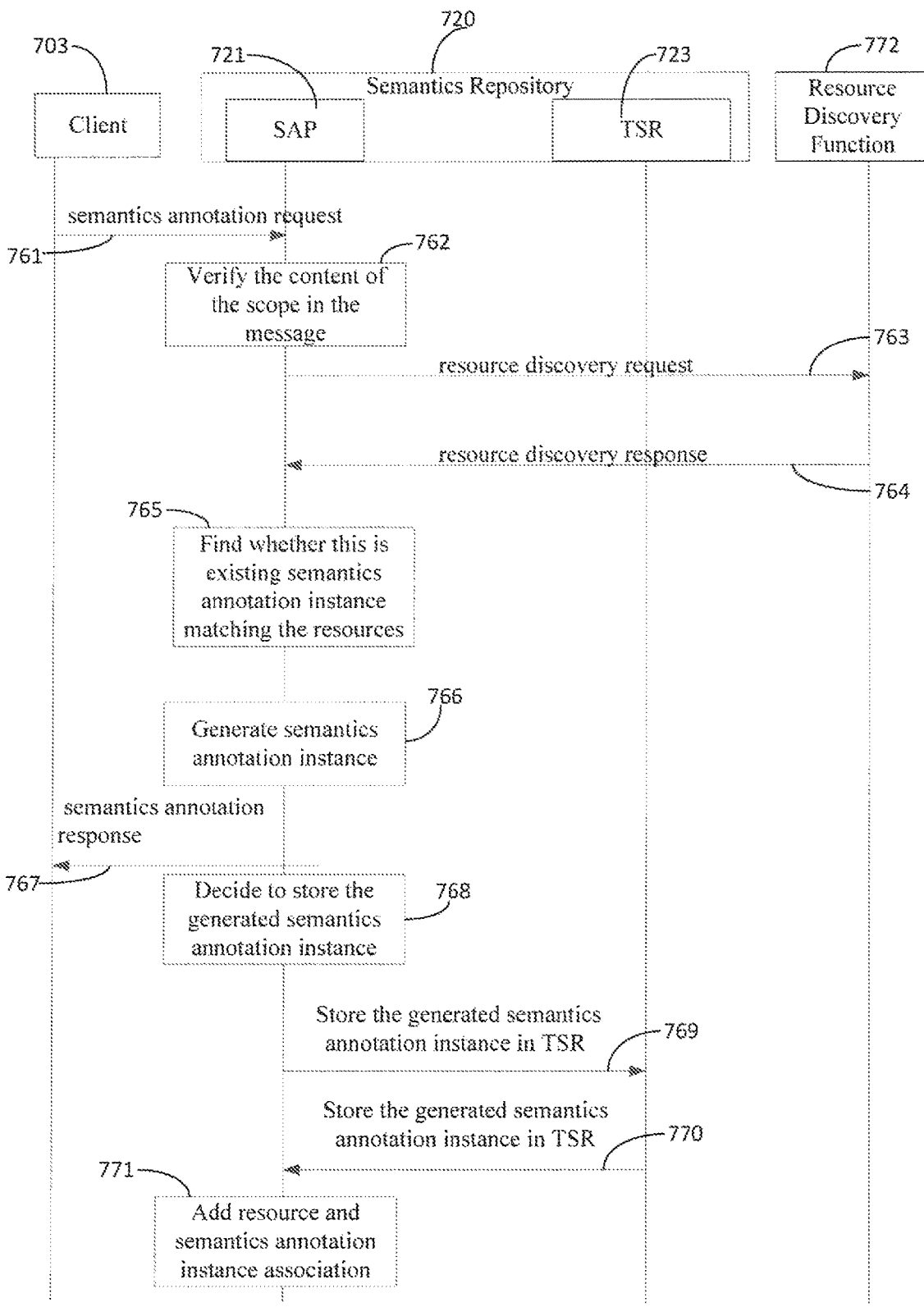
FIG. 14 illustrates an exemplary message flow of semantics annotation triggered by client's request.

FIG. 14 illustrates an exemplary message flow of semantics annotation triggered by a client's request. FIG. 14 is associated with a second scenario, in which SAP 721 may receive annotation request from clients, such as client 703. Exemplary fields in the semantics annotation request message are shown in Table 9.

TABLE 9

Semantics Annotation Request Message

| Field | Description |
|---|---|
| scope | It could contain the list of URIs of resources. From the semantics child resource of those resources, the semantics annotation instance is generated. Or It could also be filter criteria that filters the resources in Resource Repository. |
| flag | Indication of whether the client requires to return the generated semantics annotation instance representation, i.e. the Resource-Relationship-Value triples of those resources specified in the scope. |

FIG. 14 illustrates an exemplary message flow of semantics annotation generation triggered by clients' requests. At step 761, client 703 sends a semantics annotation request message to SAP 721. The semantics annotation request message may include the information shown in Table 9. At step 762, SAP 721 processes a request and verifies whether the content in the scope field of the request message contains the list of URIs of resources to be annotated or the filter criteria that filters resources to be annotated. At step 763, SAP 721 verifies that a filter criterion is contained in the scope. It sends a resource discovery request with filter criteria to resource discovery function 772, which is in charge of resource discovery in resource repository 710. At step 764, resource discovery function 772 returns the list of URIs of resources that match the filter criteria.

At step 765, SAP 721 may search over the semantics annotation instance to resource association records find out whether there is an existing semantics annotation instance that associates the same list of resources. If there is no match, then jump to step 766. Otherwise, the semantics annotation request response is the corresponding semantics annotation instance and jumps to step 767. SAP 721 may have more intelligence in matching the resources by doing a combination of different entries in the semantics annotation instance to resource association form. The semantics annotation request response should contain the combination of the matching semantics annotation instances. At step 766, SAP 721 generates a new semantics annotation instance that associates with the interested resources. Each semantic annotation instance has a unique identifier in the SAP 721. For semantic annotation instances in TSR 723, the identifier could be composed of key words of the resources URIs. At step 767, SAP 721 sends a semantics annotation request response to client 703 with the representation of the semantics annotation instance (list of triples of interested resources). Client 703 may want the representation of the semantics annotation instance to run semantics-based query over the semantics annotation instance on its own, or client 703 may want the semantics information of the interested resources in the format of triples. In other words, client 703 can retrieve the representation of the semantics annotation instance and run the semantics based query on those triples on its end. For example, the triples in FIG. 28 can be retrieved by client 703, and client 703 may run a query on those triples, such as "what are the treadmills available between 19:00-19:30 without the service layer to do that.

Figure 15:
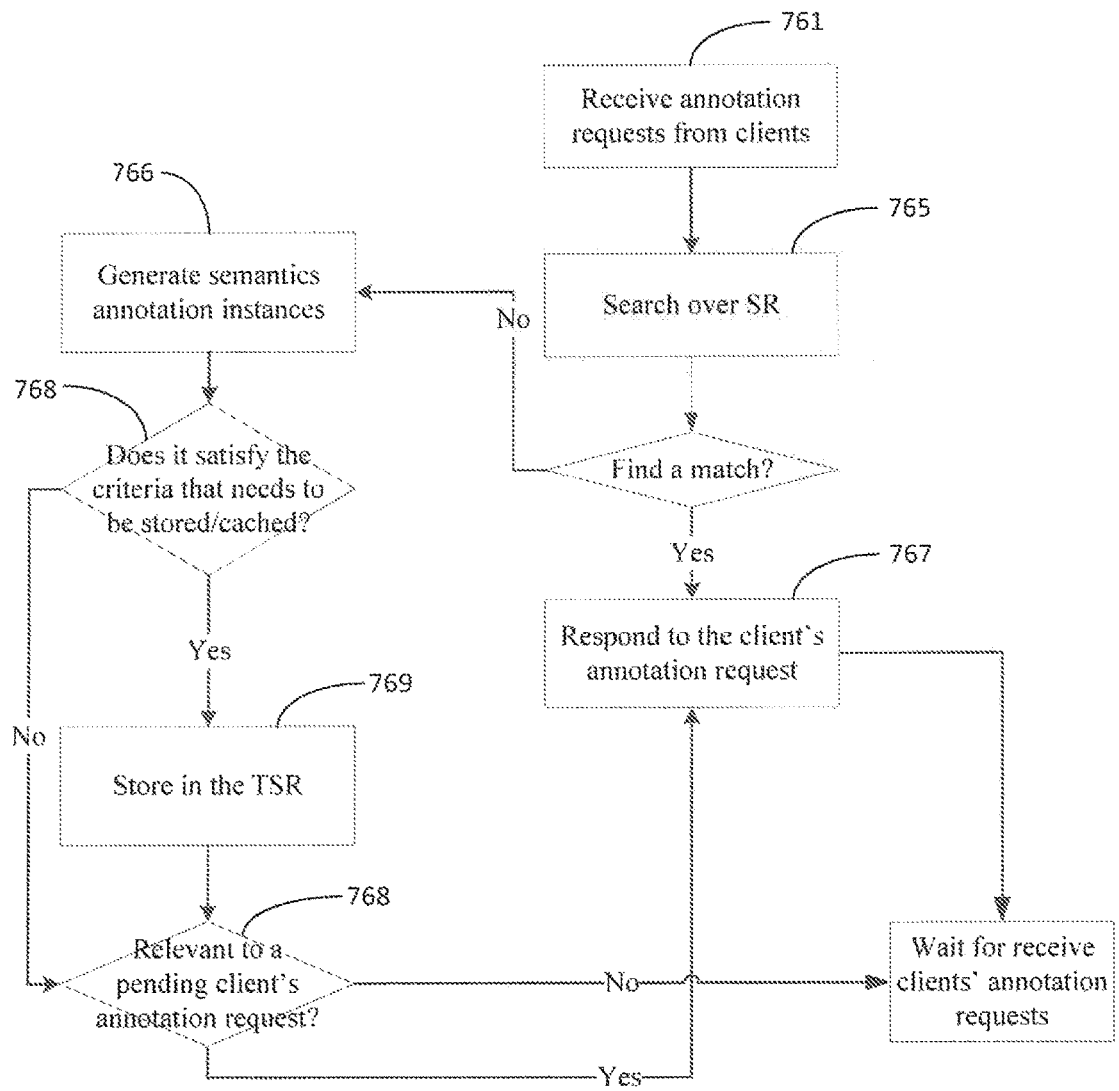
FIG. 15 illustrates an exemplary method of semantics annotation triggered by client's request.

At step 768, based on the clients' annotation request history that SAP 721 maintains in the background, SAP 721 decides that the newly generated semantics annotation instance satisfies certain policy for storing in TSR 723. TSR 723 may be designed for quicker access. It may not have a hierarchy like BSR. For example, TSR 723 may contain a few recently accessed semantics annotation instances. This type of storing policy could be based on the frequency of the resources shown in the scope of the semantics annotation requests, or based on the overhead in generating the semantics annotation instance, e.g. some resources are not stored locally, which require remote retrieval of the resource semantics information. The semantics annotation instances stored in TSR 723 have a valid time period, which may become invalid after an expiration time. In an example taken from the gym use case of FIG. 6, the request could be to annotate all treadmill applications. If there are many clients requesting this annotation, SAP 721 can decide to store the annotation instance in TSR 723 for future same requests. At step 769, SAP 721 may send the newly generated semantics annotation instance to TSR 723 to be stored. At step 770, TSR 723 confirms SAP 721 the successful storing of the semantics annotation instance. At step 771, SAP 721 adds the resource and semantics annotation instance association relationship in both tables as shown in Table 4 and Table 5. FIG. 15 is exemplary illustration of a method that closely aligns with the exemplary message flow of FIG. 13.

SAP 721 updates the semantics annotation instances when the involved resource semantics is updated. SAP 721 also updates the semantics annotation instances when a resource under the scope is created/deleted. There are multiple ways to trigger SAP 721 to perform an update to a semantics annotation instance. In a first example, SAP 721 subscribes the resource and its semantics child resource in the RR 710 (e.g., a new resource being added to the resource repository or a resource's semantics child resource being updated will be notified to SAP). In a second example, RR 710 maintains the association information attached to the resource itself (e.g. the annotationInst attribute discussed herein indicates that the semantics annotation instances in this attribute are associated with the resource). In the following we discuss this method in details. In the second example, there is no subscription. The annotationInst attribute maintains the annotation instances associated with this resource. When the resource semantics changes, RR 710 will send a request to Semantics Repository 720 to update the associated semantics annotation instances.

Figure 16:
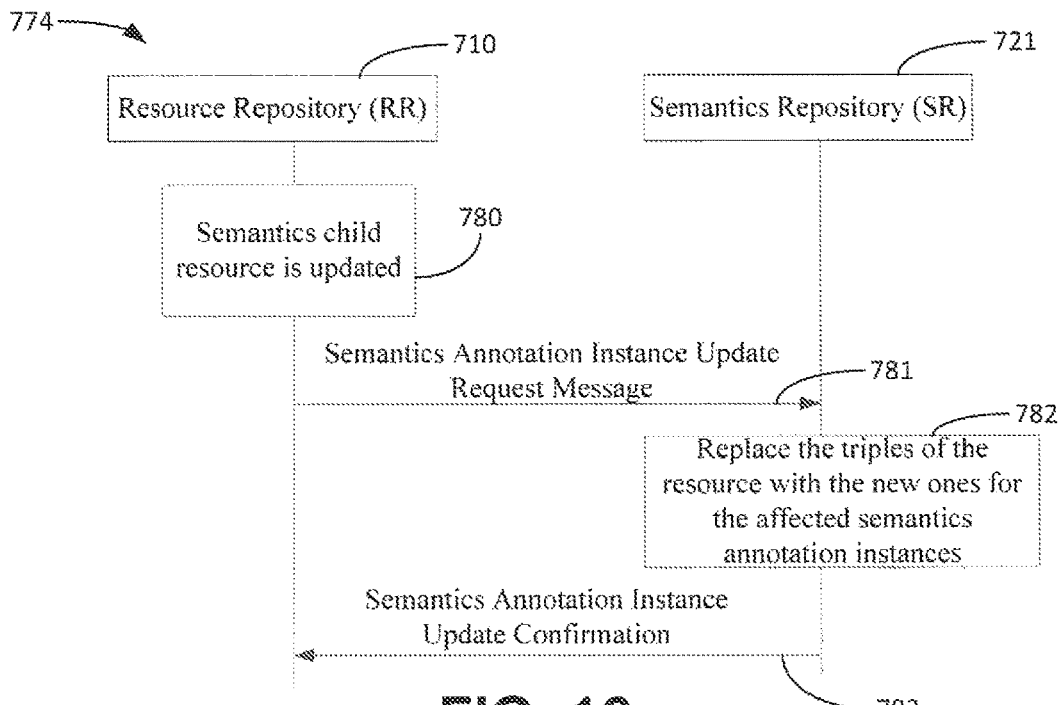
FIG. 16 illustrates an exemplary message flow semantics annotation instance update—case 1.
Figure 17:
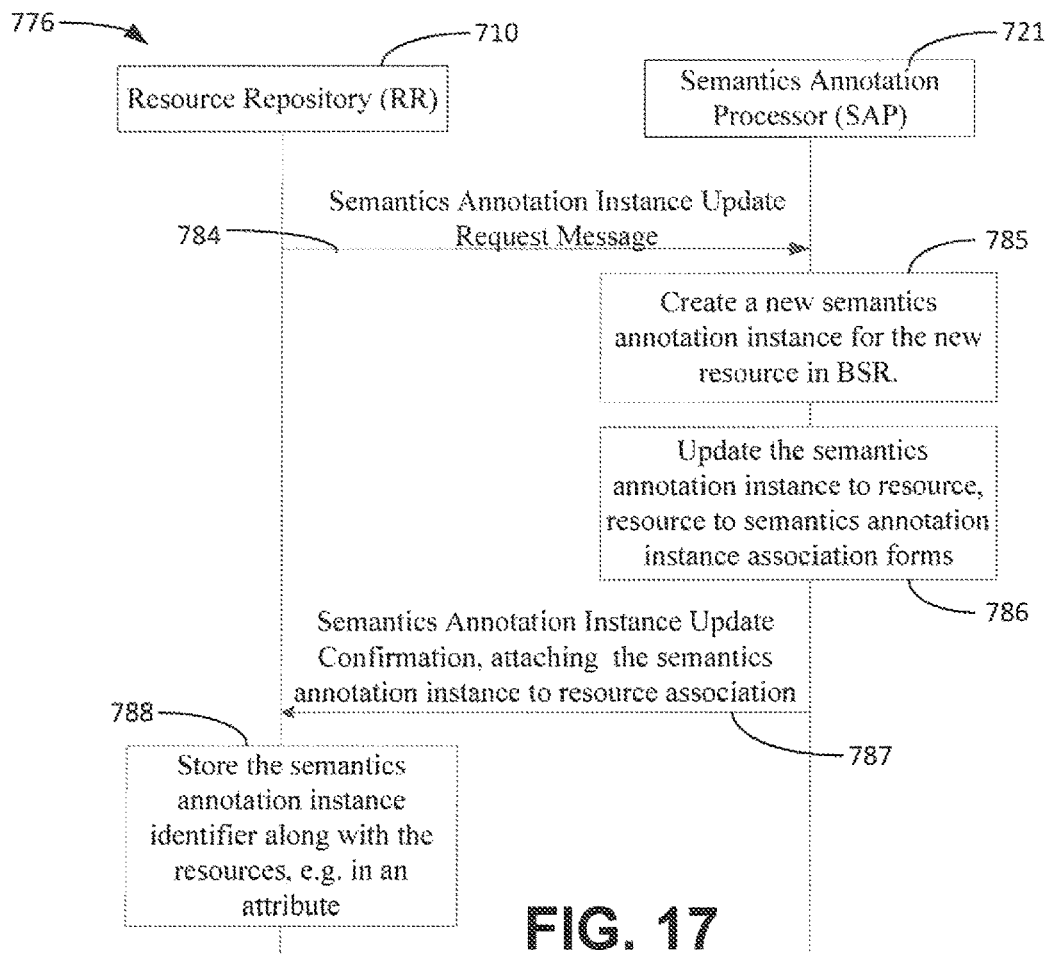
FIG. 17 illustrates an exemplary message flow semantics annotation instance update—case 2.
Figure 18:
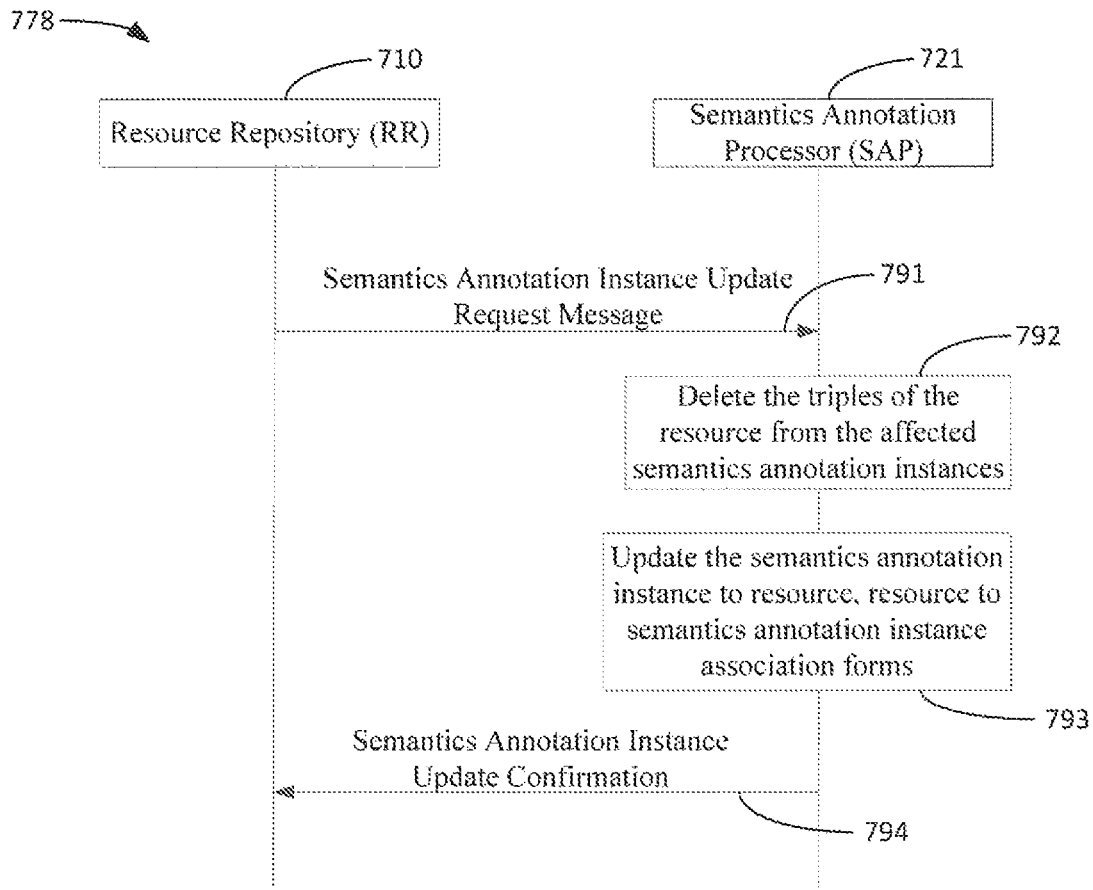
FIG. 18 illustrates an exemplary message flow semantics annotation instance update—case 3.

FIG. 16 through FIG. 18 are exemplary methods for cases involving semantics annotation instance updates. In summary, as discussed herein, case 1 (FIG. 16) is a case where a resource's semantics information is changed, case 2 (FIG. 17) is a case where a resource is added to the resource repository, and case 3 (FIG. 18) is a case where a resource is deleted from a resource repository. The case numbers may be inserted into field in a semantics annotation instance update request message, as shown in Table 10. It should be understood that a case number as indicated in the Table 10 is not mandatory and another indicator that is indicative of the adding, deleting, or updating of a resource is allowable.

TABLE 10

Semantics Annotation Instance Update Request Message

| Field | Description |
|---|---|
| case | It may be 1, 2, 3 as defined in the disclosure |
| URI | The URI of the relevant resource |
| semanticsResource | Semantics information of the resource in Relationship-Value value (present in Case 1, 2) |
| identifier | List of identifiers of affected semantics annotation instances (present for case 1, 3) |

FIG. 16 illustrates an exemplary method 774 for a semantics annotation instance update associated with an update of semantics information for a resource (e.g., semantics child resource is updated). At step 780, a semantics child resource is updated. At step 781, RR 710 sends a semantics annotation instance update request message with a case value of 1 to SR 720. The semantics annotation instance update request message may also include URI field that indicates the resource's URI, semanticsResource field that includes the new semantics information of the resource, and an identifier field that indicates the affected semantics annotation instances. SR 720 may be subscribed to the resource and its semantics child resource in the RR 710 (e.g., a new resource being added to the resource repository or a resource's semantics child resource being updated will trigger a notification to SR 720). At step 782, SR 720 replaces the triples of the resource with new ones for the affected semantics annotation instances. At step 783, SR 720 returns a semantics annotation instance update confirmation to RR 710.

Case 2 is with regard to resource being added to a RR (FIG. 17). This often affects the semantics annotation instances in BSR, since a parent resource's semantics annotation instance is composed of its children. So when a resource is added to a layer, it may affect semantics annotation instances in BSR for its above layer resources. For example, if a new contentInstance is added with semantics information, a new semantics annotation instance will be created for this contentInstance. Its parent container resource's semantics annotation instance will include this new semantics annotation instance, which in turn affects AE, CSEBase's semantics annotation instances, for example.

FIG. 17 illustrates an exemplary method 776 for a semantics annotation instance update associated with adding a resource to RR 710. At step 784, RR 710 sends semantics annotation instance update request message to SAP 721 with a case value of 2 regarding an added resource to RR 710. In addition, the URI field indicates the new resource's URI and the semanticsResource field includes the semantics information of the resource. At step 785, SAP 721 creates in BSR 722 a new semantics annotation instance for the new resource in RR 710. SAP 721 may update all parent semantics annotation instances by adding this semantics annotation instance under the hierarchy or adding the triples of the new resources to all its parent semantics annotation instances. At step 786, SAP 721 creates a new semantics annotation instance to resource association entry, as well as a new resource to semantics annotation instance entry. The semantics annotation instance to resource association entry contains the identifier of the new semantics annotation instance and the URI of the resource. The resource to semantics annotation instance association entry contains the URI of the resource, the identifier of the new semantics annotation instance as well as identifiers of all its parent semantics annotation instances. At step 787, SAP 721 sends a semantics annotation instance update confirmation to RR 710, attaching the semantics annotation instance to resource association record. At step 788, RR 710 may store the semantics annotation instance identifier along with resource (e.g., in an attribute of the added resource).

FIG. 18 illustrates an exemplary method 778 for a semantics annotation instance update associated with deleting a resource from RR 710. At step 791, RR 710 sends to SAP 721 a semantics annotation instance update request message with a case value of 3 regarding deleting a resource from RR 710. The semantics annotation instance update request message may also include a URI field that indicates the deleted resource's URI and an identifier field that indicates affected semantics annotation instances. At step 792, SAP 721 deletes the triples of the resource from the affected semantics annotation instances. One semantics annotation instance that only contains the triples of the deleted resource will become empty. At step 793, SAP 721 deletes the record of the resource in the resource to semantics annotation instance association form. SAP 721 deletes the entry of semantics annotation instance identified in step 792 from the semantics annotation instance to resource association form. SAP 721 deletes the URI of the resource from other affected entries in semantics annotation instance to resource association form. At step 794, SAP 721 may return a semantics annotation instance update confirmation to RR 721.

With regard to deleting a resource from RR 710, if the deleted resource has normal child resource, e.g. <container> has <contentInstance> child resources, the above steps as described with regard to method 778 may be carried out recursively from the lowest layer child of the deleted resource until the resource itself. For example when deleting <container>, RR 710 first assumes that <contentInstance> will be deleted, and starts the steps shown with regard to method 778 to handle the deletion of the <contentInstance>. When all <contentInstance> resources under the container are handled, the <container> resource can be handled by the appropriate steps of method 778.

Figure 19:
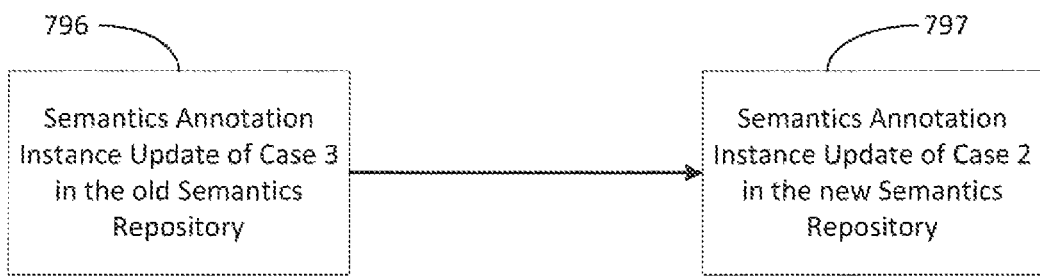
FIG. 19 illustrates an exemplary method for semantics annotation instance migration.

Semantics annotation instance migration is discussed below. SAP 721 can move the semantics annotation instances to another semantics repository when resources involved are moved to a new location (physical or logical). SAP 721 can update the affected semantics annotation instances when part of the involved resources are moved to new location(s). For example, treadmill 737 of FIG. 6 is moved from second floor to the first floor, thus the treadmill AE deregisters from gateway 731 on the second floor and registers to gateway 733 on the first floor. As a result, the treadmill AE is deleted from the current RR 710 residing in the second floor gateway 731 CSE, and created in the new RR residing in the first floor gateway 733 CSE. The semantics annotation instance migration actually can be achieved by the combination of semantics annotation instance update of Case 3 (method 778) and Case 2 (method 776), respectively. FIG. 19 illustrates an exemplary method for semantics annotation instance migration with reference to FIG. 6, FIG. 17, and FIG. 18. At step 796, SAP 721 on a gateway of the second floor will update the semantics annotation instance according to Case 3 (method 778), since the treadmill AE resource is deleted from the CSEBase on the gateway of the second floor. At step 797, SAP on the gateway of the first floor will update the semantics annotation instance according to Case 2 (method 776), since a new treadmill AE resource will be created under the CSEBase on the gateway of the first floor.

Figure 20:
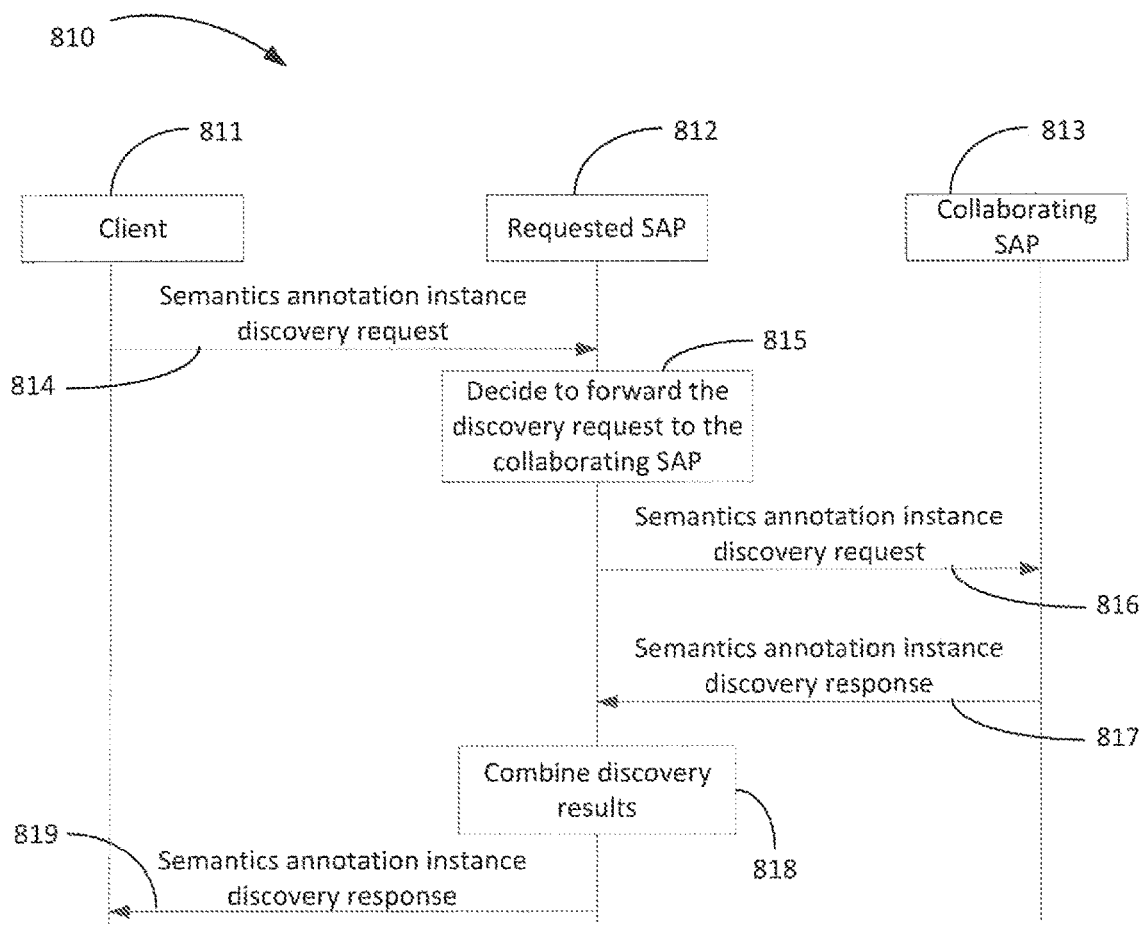
FIG. 20 illustrates a message flow of semantics annotation instance discovery request.

Below is a discussion of semantics annotation instance discovery. SAP (e.g., SAP 721) can discover and return the semantics annotation instances in the local SR based on clients' queries or collaborate with other SR in other M2M entities by forwarding the queries. FIG. 20 illustrates an exemplary message flow of semantics annotation instance discovery. At step 814, a client 811 sends a semantics annotation instance discovery request. The semantics annotation instance discovery request of step 814 may be in the format as shown in Table 11. It should be understood that an option number as indicated in the Table 11 is not in a mandatory form and another indicator that relays the same or similar information with regard to option may be used.

TABLE 11

Semantics Annotation Instance Discovery Request Message

| Field | Description |
|---|---|
| option | It may be 1 or 2.<br>Option 1: The request message contains the URIs of the resources that the client wants to discover the corresponding semantics annotation instance.<br>Option 2: The request message contains the filter criteria for the resources that the client wants to discover the corresponding semantics annotation instance. |
| URI | The URIs of the interested resources (only present in option 1) |
| filterCriteria | Semantics information of the resource in Relationship-Value value (present in option 2) |

With continued reference to FIG. 20, at step 815, requested SAP 812 processes the request of step 814 and may decide to provide the request to the collaborating SAP 813. Requested SAP 812 and collaborating SAP 813 may be aware of each other, be physically near each other, or have a business relationship. For option 1, the URIs of the resources may indicate the resources are stored in the collaborating RR (not shown). In order to discover the corresponding semantics annotation instance, requested SAP 812 decides to provide the request of step 814 to collaborating SAP 813. For option 2, it is likely the collaborating RR (not shown) may have resources that match the filter criteria. Thus requested SAP 812 decides to provide the request of step 814 to collaborating SAP 813.

At step 816, the semantics annotation instance discovery request message is provided to collaborating SAP 813. At step 817, collaborating SAP 813 processes the request, and returns the matching semantics annotation instance identifier(s) and/or the representation. At step 818, requested SAP 812 combines the discovery results. At step 819, requested SAP replies to client 811 with the semantics annotation instance discovery result.

An example situation with regard to method 810 may be seen with reference to the gym use case of FIG. 6. For example, client 811 may want to discover the semantics annotation instances for all treadmills in the gym of FIG. 6. SAP 721 on the gateway 733 of the first floor receives such request; it will collaborate with the gateway 731 of the second floor by forwarding the request and combining the discovery results.

Discussed below are additional examples associated with oneM2M. As discussed herein, semantics of a resource can be described by a Resource-Relationship-Value triple, consisting of a resource, a relationship, and a value. Values can be classes or other resources. The following are some examples:

- A content instance (resource) hasType (relationship) temperatureReading (class)
- A content instance (resource) generatedBySameApplicationAs (relationship) another content instance (resource)

For a normal resource (e.g. <AE>, <container>), since in Resource-Relationship-Value triples, the resource itself is fixed and known, what is missing is the collection of Relationship-Value doubles. A new <semantics> child resource can be added to provide semantics description to resources. The <semantics> child resource of a resource contains Relationship-Value doubles in its description attribute that describes the resource's semantics.

Figure 21:
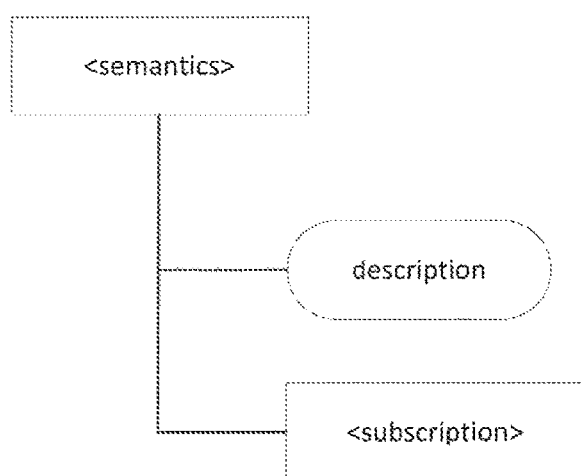
FIG. 21 illustrates an exemplary resource structure of <semantics>.

FIG. 21 illustrates a resource structure of the <semantics> resource. The description attribute of the <semantics> resource contains a list of Relationship-Value doubles, which is of a complex datatype. The complex datatype is a list of Relationship-Value doubles with the format shown in Table 17. Table 12 and Table 13 respectively show the child resource and attributes of the <semantics> resource. Table 12, Table 13, and the other tables discussed herein are examples. The following is an exemplary list of resources that may enable semantics information if the <semantics> child resource is added to them: <CSEBase>, <remoteCSE>, <AE>, <container>, <contentInstance>, <group>, and <node>.

TABLE 12

Child Resources of <semantics> Resource

| Child Resource Type | Multiplicity | Description |
|---|---|---|
| <subscription> | 0 . . . n | See clause 9.6.8 in oneM2M-TS-0001 oneM2M Functional Architecture-V-1.1.0 (hereinafter [1]) |

TABLE 13

Attributes of <semantics> Resource

| Attribute Name | Multi-plicity | RW/RO/WO | Description |
|---|---|---|---|
| resourceType | 1 | RO | See clause 9.6.1 in [1]where this common attribute is described. |
| parentID | 1 | RO | See clause 9.6.1 in [1]where this common attribute is described. |
| expirationTime | 1 | RW | See clause 9.6.1 in [1] where this common attribute is described. |
| accessControlPolicy IDs | 0 . . . n | RW | See clause 9.6.1 in [1] where this common attribute is described. |
| creationTime | 1 | RW | See clause 9.6.1 in [1] where this common attribute is described. |
| lastModifiedTime | 1 | RO | See clause 9.6.1 in [1]where this common attribute is described. |
| Labels | 0 . . . n | RO | See clause 9.6.1 in [1]where this common attribute is described. |
| announceTo | 1 | RW | See clause 9.6.1 in [1] where this common attribute is described. |
| announcedAttribute | 1 | RW | See clause 9.6.1 in [1]where this common attribute is described. |
| description | 1 | RW | List of Relationship-Value doubles that describes the parent resource's semantics. |

Figure 22:
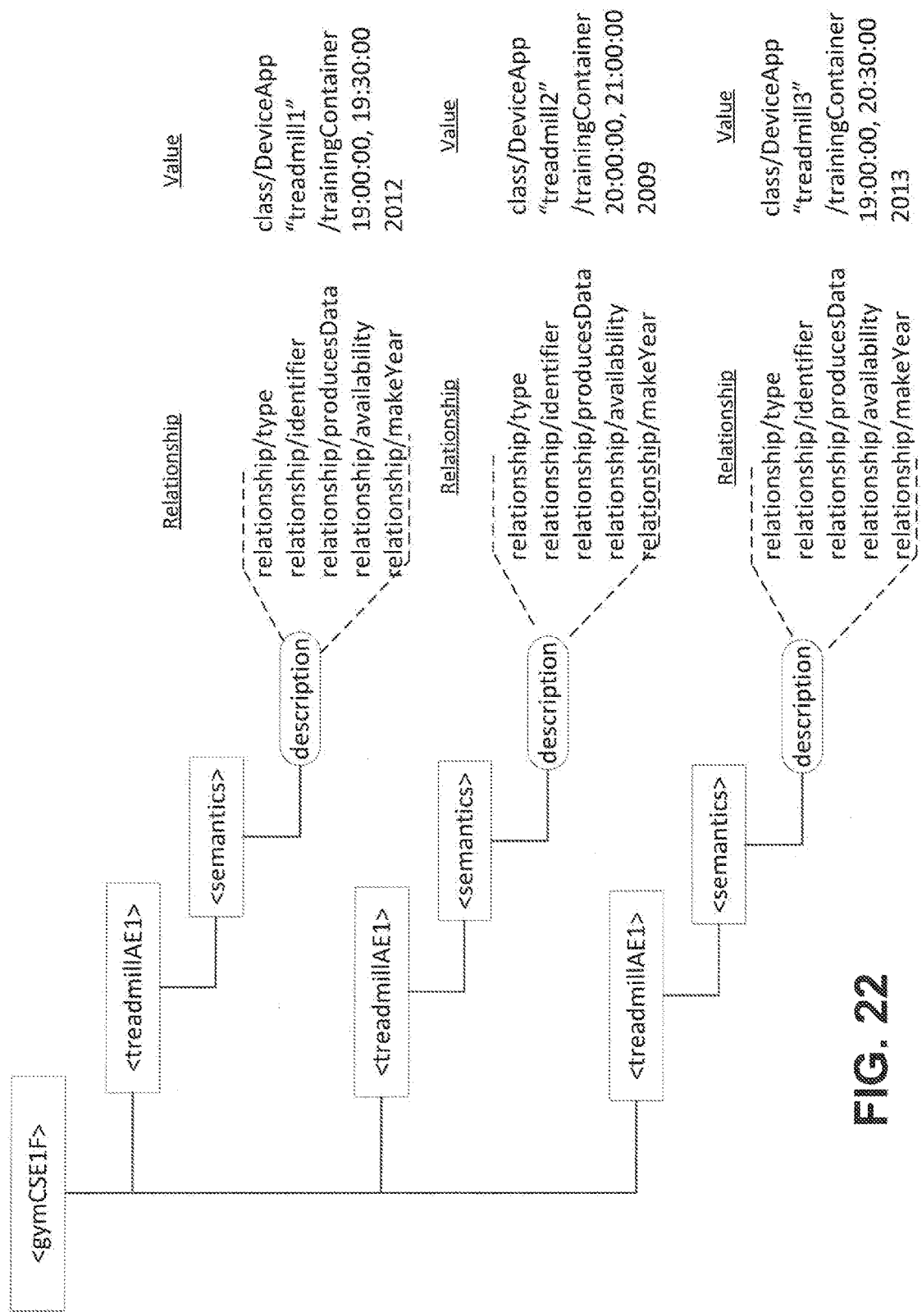
FIG. 22 example of semantics child resource in gym use case.
Figure 23:
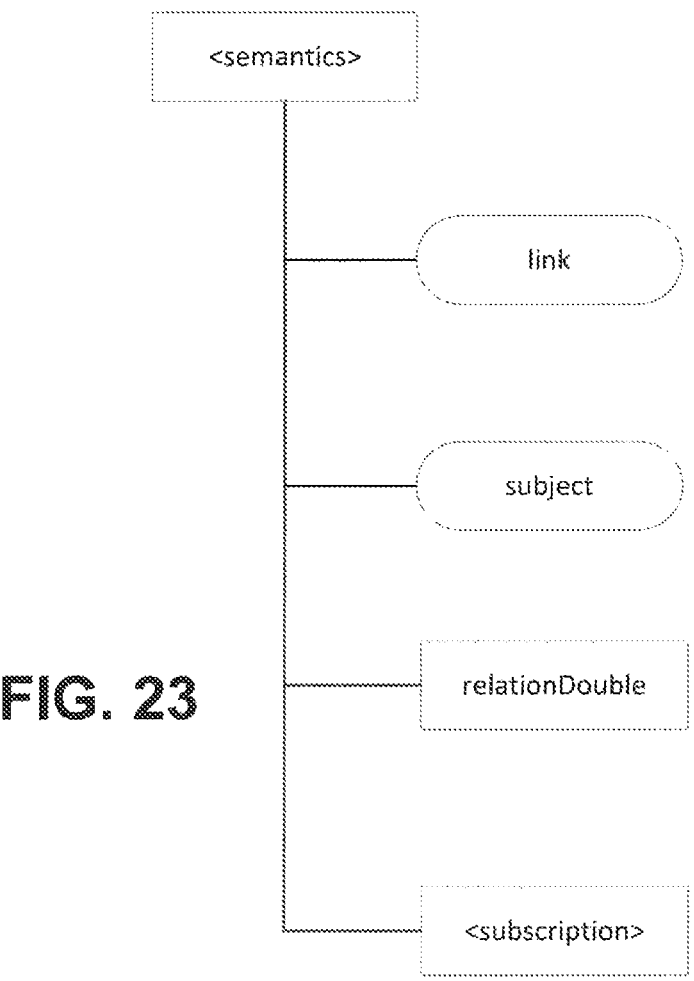
FIG. 23 illustrates an exemplary alternative resource structure of <semantics>.

FIG. 22 illustrates the semantics child resource description that reflects the semantics information of treadmill AEs represented in FIG. 7. Alternatively, the content of the description attribute may be moved into child resources of the <semantics> resource as shown in FIG. 23. Table 14 shows the <semantics> resource has a new child resource <relationDouble>.

With continued reference to FIG. 23 and Table 14, SAP 721 may create and use single semantics annotation instances to describe multiple resources and annotation instances which are stored away from the subject resource, providing storage optimization and flexibility. SAP 721 may maintain the association between resources and their annotations, when stored remotely, to preserve discovery functionality. For example, the description provided by the <semantics> resource may be augmented in order to provide additional flexibility. The subject attribute enables single semantics annotation instances to describe multiple resources and provides flexibility for the storage location. At the same time, it may be omitted when the single subject of the <relationDouble> is the parent resource, for simplicity and storage optimization. The association between resources and their annotations, when stored remotely, is preserved through the use of the link attribute, which points to <semantics> resources with remote annotations.

TABLE 14

Child Resources of <semantics> Resource

| Child Resource Type | Multiplicity | Description |
|---|---|---|
| link | 0 . . . 1 | If provided, contains link to the resources where the semantics are stored. If not provided this is locally stored annotation |
| subject | 0.1 | If provided, may be a list of URI for all the resources described by the Relationship-Value semantic information contained in the <relationDouble> sub-resource(s). Those resources in turn would point their link attribute to this <semantics> resource. If subject attribute is not provided, all the <relationDouble> children following have as subject the parent of this <semantics> resource. |
| <subscription> | 0 . . . n | See clause 9.6.8 in [1] |
| <relationDouble> | 0 . . . n | It contains a Relationship-Value double that describes one piece of semantics information of the parent resource of <semantics> resource. |

Figure 24:
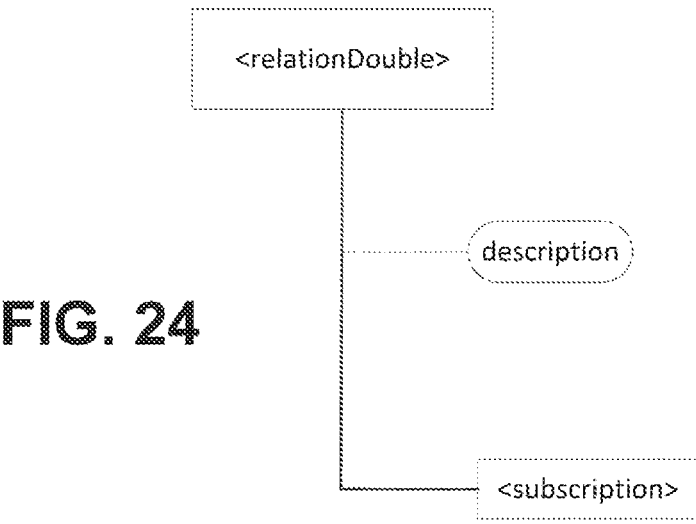
FIG. 24 illustrates an exemplary resource structure of <relationDouble>.

The resource tree structure of <relationDouble> is shown in FIG. 24. Table 15 shows the child resource. Table 16 shows the attributes of the <relationDouble> resource. The common attributes that may apply here are listed in Table 13.

TABLE 15

Child Resources of <relationDouble> Resource

| Child Resource Type | Multiplicity | Description |
|---|---|---|
| <subscription> | 0 . . . n | See clause 9.6.8 in [1] |

TABLE 16

Attribute of <relationDouble> Resource

| Attribute Name | Multiplicity | RW/RO/WO | Description |
|---|---|---|---|
| description | 1 | RW | It contains the Relationship-Value double that describes a piece of semantics information of the <semantics> parent resource. |

Figure 25:
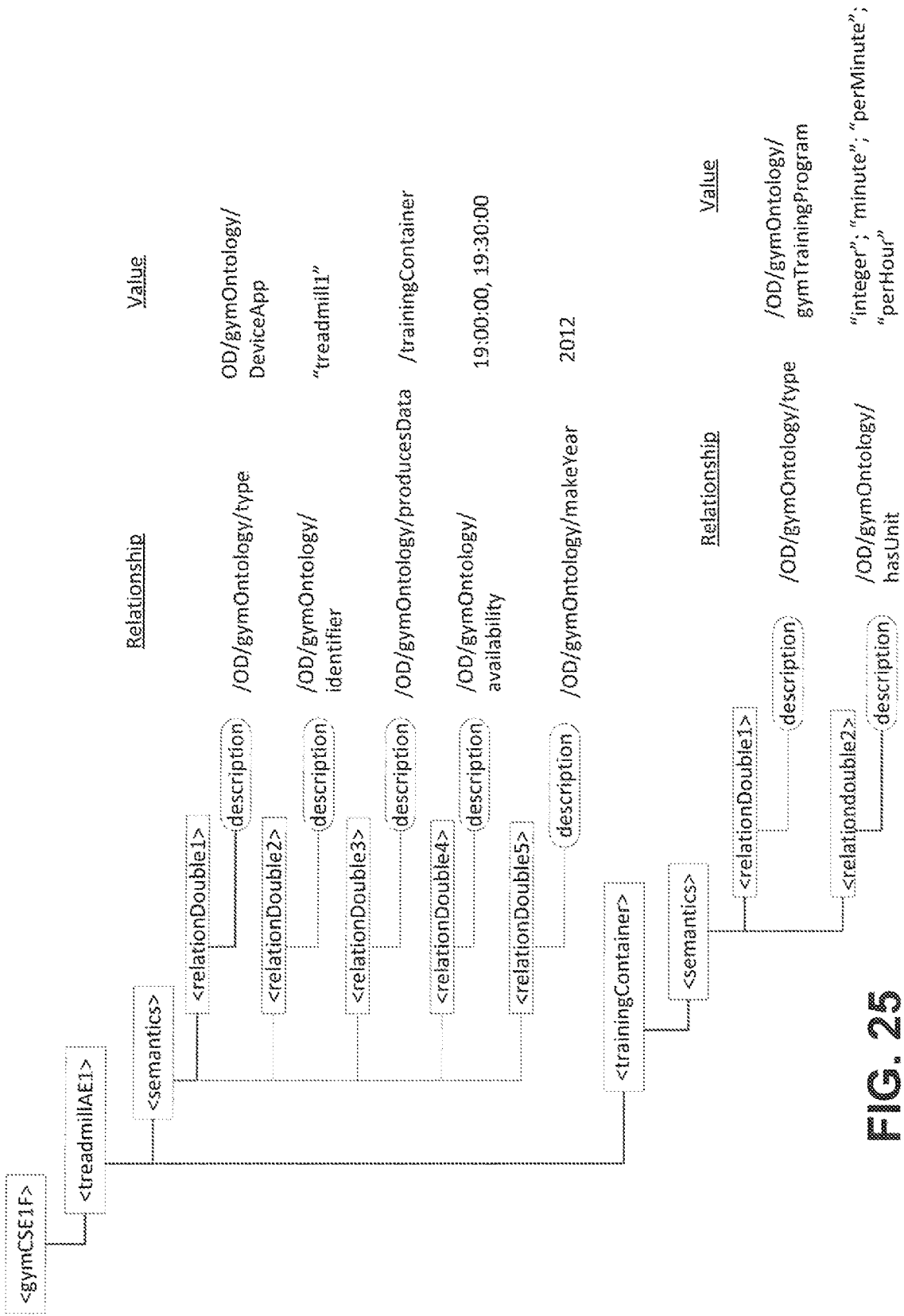
FIG. 25 illustrates an example of semantics child resource in gym use case.

The description attribute of the <relationDouble> has the complex datatype as shown in Table 17. The description attribute includes the fields "relationship" and "value." The relationship field has the data type of AnyURI, which points to a relationship resource stored in ontology repository. The value may be any data type. Thus any could be composed of enumerations of any possible data types, such as class or those primitive data types defined in XSD (e.g., duration, dateTime, etc.). FIG. 25 shows an example of semantics child resource of an <AE> resource and a <container> resource, which contains the Relationship-Value doubles for a treadmill AE.

TABLE 17

Complex Datatype of description Attribute of <relationDouble> Resource

| Name | Type |
|---|---|
| relationship | AnyURI |
| value | Any |

A new annotationInst attribute is disclosed. The annotationInst attribute may be added to a resource which is annotated in the semantics annotation instance. The annotationInst attribute stores the identifier(s) of the semantics annotation instance(s). With this annotationInst attribute, the resource and the semantics annotation instance can be associated. When there is an update on the resource's semantics, the semantics annotation instance can be updated as well. The resource that has the <semantics> child resource will also be added with the annotationInst attribute.

Figure 26:
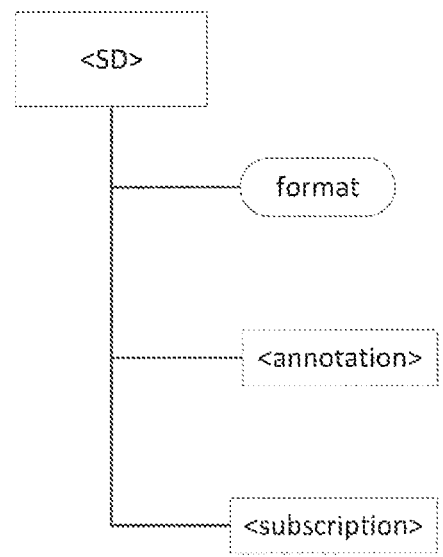
FIG. 26 illustrates exemplary child resources of <SD> resource.

Discussed below is a semantics database (e.g., semantics repository 720). <SD>, as shown in FIG. 26, stores the resources for RESTFUL operations of semantics annotation in a semantics database. <SD> resource can be located under CSEBase. The format attribute of <SD> indicates the format of the semantics information in semantics database, which could be any number of triples (N-triples). Table 18 shows the child resources of <SD>. Table 19 shows attributes of <SD> and Table 13 shows more attributes that may be applicable here. Alternatively, the <SD> resource could be a virtual resource that acts as the RESTFUL interface to access the semantics database. Then the <SD> resource may not have any child resource or attribute. The annotation child resource can be located under CSEBase. A "virtual resource" is used in ETSI m2m and oneM2M. A virtual resource may be considered to act as an interface and usually does not have any child resources or attributes.

TABLE 18

Child Resources of <SD> Resource

| Child Resource Type | Multiplicity | Description |
|---|---|---|
| <annotation> | 0 . . . n | See discussion with regard to <annotation> resource |
| <subscription> | 0 . . . n | See clause 9.6.8 in [1]. |

TABLE 19

Attributes of <SD> Resource

| Attribute Name | Multiplicity | RW/RO/WO | Description |
|---|---|---|---|
| format | 1 | RO | It indicates the adopted format of semantics information, e.g. Turtle. |

Figure 27:
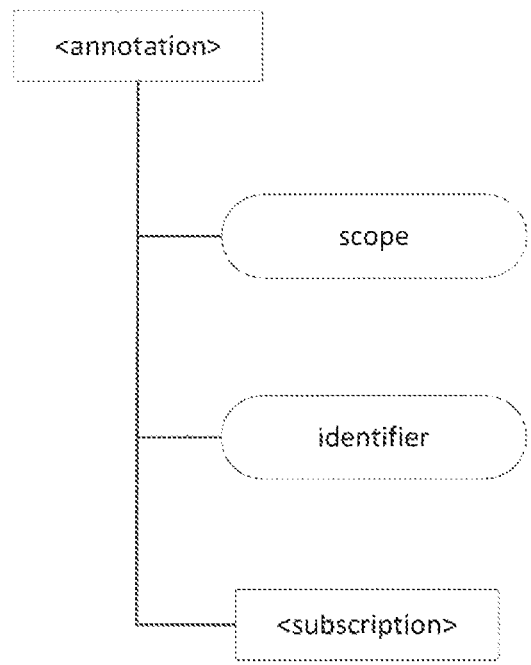
FIG. 27 illustrates exemplary <annotation> resource.

The <annotation> resource is targeted when semantics annotation request is sent. The resource tree structure of <annotation> is shown in FIG. 27. Table 20 shows the child resources of <annotation>. The attributes of <annotation> resource is shown in Table 21 and Table 13 shows more attributes that may be applicable here. Alternatively, the <annotation> resource could be a virtual resource that may act as the RESTFUL interface to perform semantics annotation on resources.

TABLE 20

Child Resources of <annotation> Resource

| Child Resource Type | Multiplicity | Description |
| --- | --- | --- |
| <subscription> | 0 . . . n | See clause 9.6.8 in [1]. |

TABLE 21

Attributes of <annotation> Resource

| Attribute Name | Multiplicity | RW/ RO/ WO | Description |
| --- | --- | --- | --- |
| scope | 1 | RW | Includes the list of URIs of resources from whose <semantics> child resource the semantics annotation instance is generated from. |
| identifier | 1 | RO | Denotes the identifier of the semantics annotation instance in the Semantics Database. |

The semantics of treadmill AEs in FIG. 22 is annotated into a semantics annotation instance in Turtle format as shown in FIG. 28.

Figure 29:
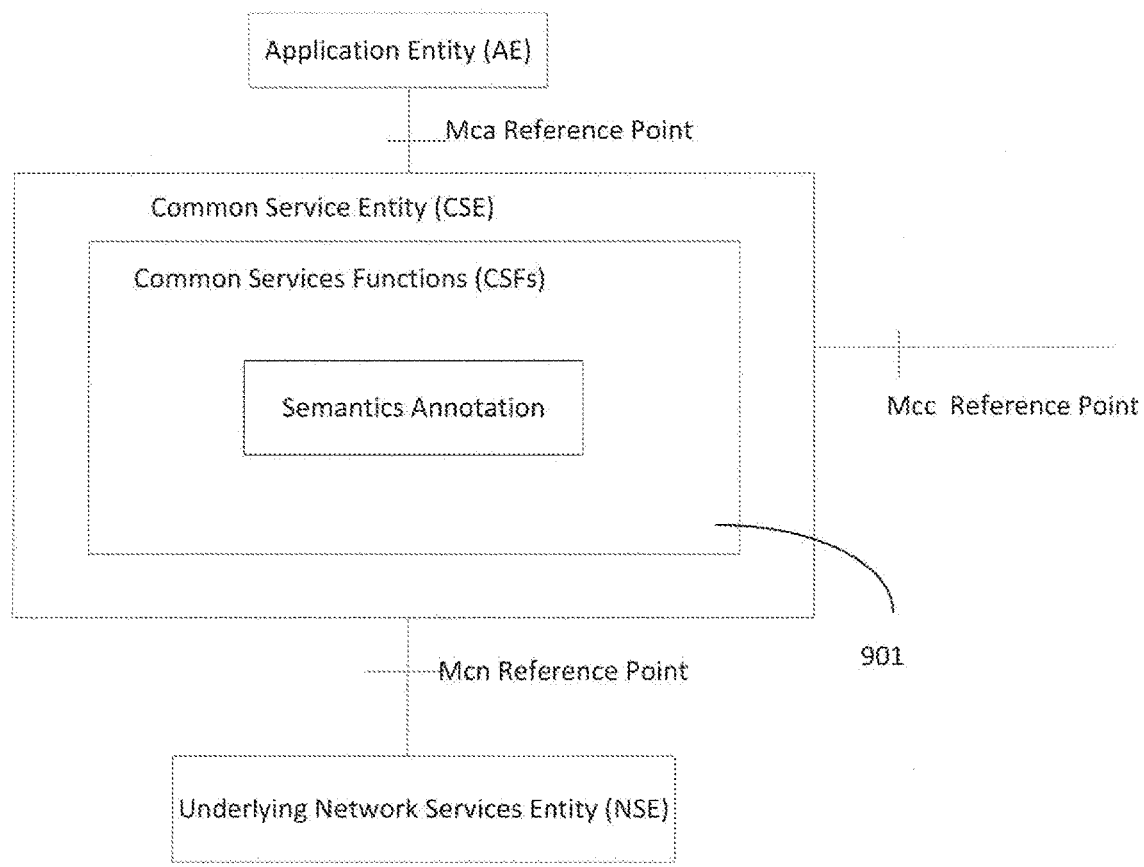
FIG. 29 illustrates an exemplary oneM2M semantics annotation CSF.

Below is a discussion of the ROA and SOA with regard to semantics annotation. As discussed before, oneM2M defines the capabilities supported by the oneM2M service layer. The oneM2M service layer is instantiated as a common services entity (CSE) which comprises a set of common service functions (CSF). As one example, the disclosed SAP 721 may be hosted in a CSE as an oneM2M CSF under semantics annotation as shown in FIG. 29. In another example, SAP 721 may be part of semantics CSF or Data Management and Repository CSF, which supports the functionalities of M2M semantics support (e.g., FIG. 8). oneM2M verticals (e.g., AEs communicating with the semantics annotation CSF via the Mca reference point to request semantics annotation of resources) discover semantics annotation instances. Other CSEs may talk to the semantics annotation CSF via the Mcc reference point to request semantics annotation of resources or discover semantics annotation instances.

Figure 30:
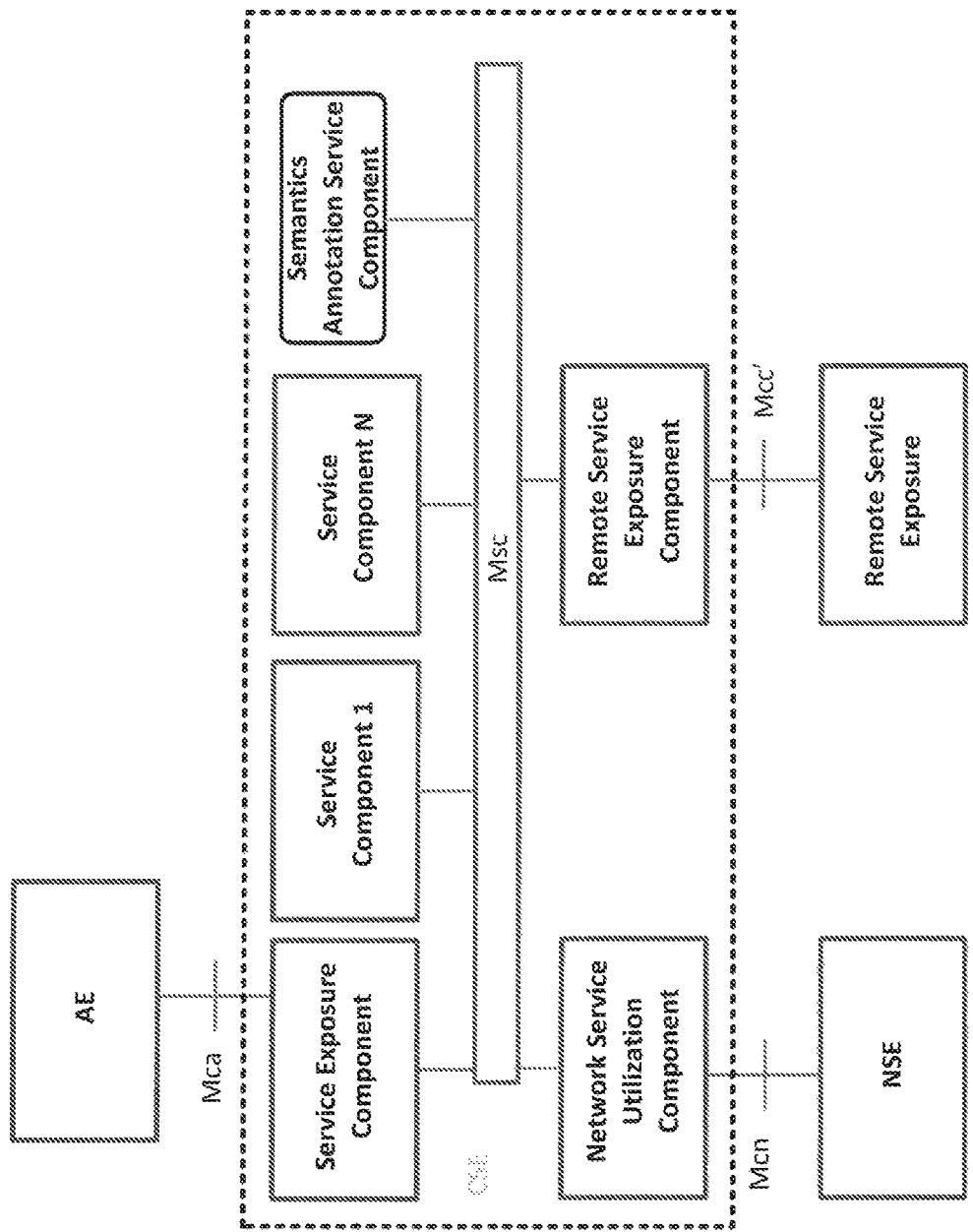
FIG. 30 illustrates an exemplary oneM2M service component architecture.

FIG. 30 illustrates an implementation architecture of semantics annotation in the oneM2M service component architecture (TS-0007 Service Component Architecture-V-0.4.0). oneM2M verticals (e.g., AEs communicating with the semantics annotation service component via the Mca reference point to request semantics annotation of resources) discover semantics annotation instances. The messages and procedure disclosed herein apply to the reference points.

Figure 31:
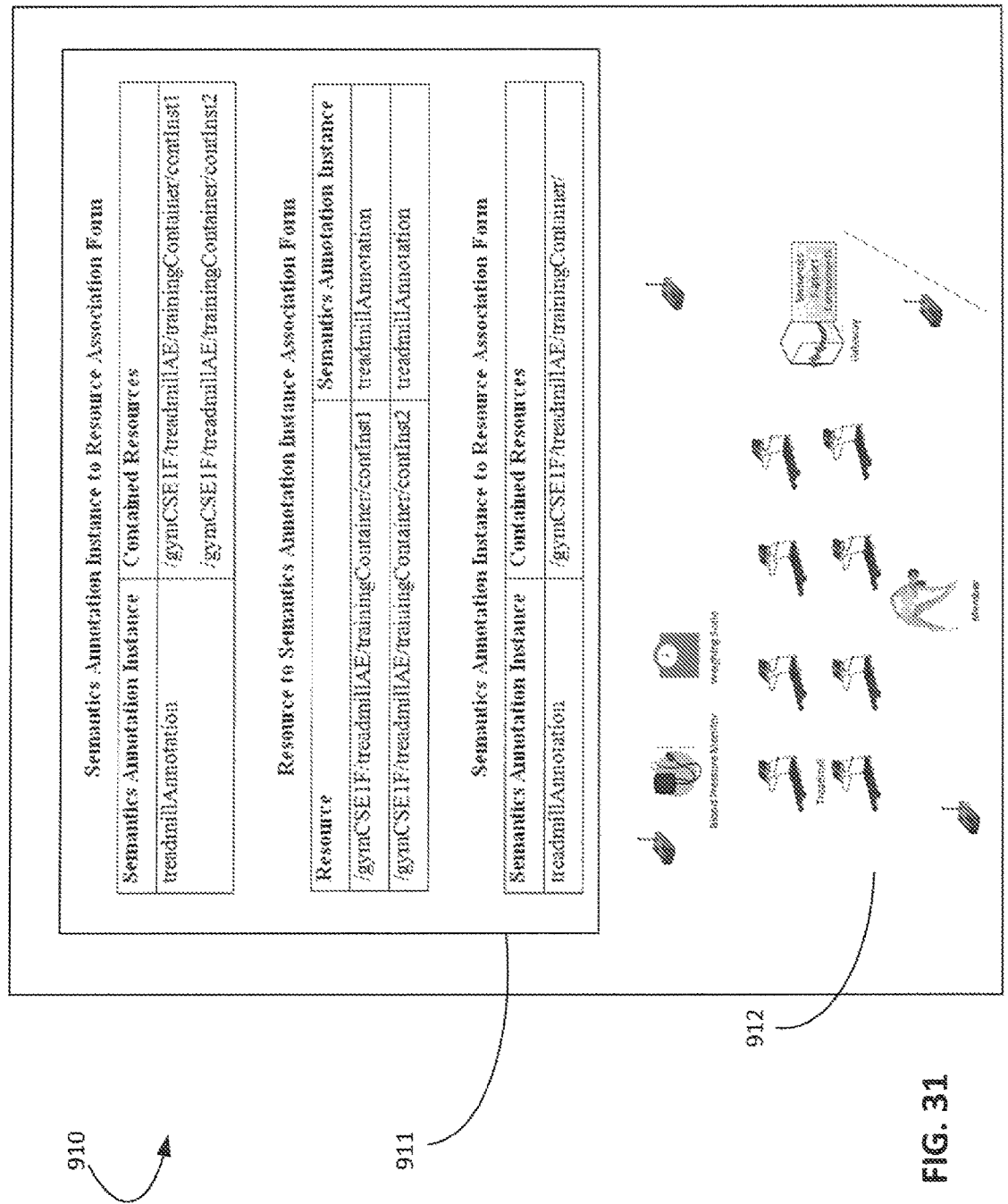
FIG. 31 illustrates an exemplary relationship or association between Semantic Annotation Instance and Resource (e.g. Annotation Subject)

FIG. 31 illustrates an exemplary display (e.g., graphical user interface) that may be generated based on the methods and systems discussed herein. Display interface 910 (e.g., touch screen display) may provide text in block 911 associated with semantics annotation or semantics repository, such as the parameters of Table 1 through Table 21. In another example, progress of any of the steps (e.g., sent messages or success of steps) discussed herein may be displayed in block 911. In addition, graphical output 912 may be displayed on display interface 910. Graphical output 912 may be the topology of the devices or resources associated with semantics annotation or semantics repository (e.g., FIG. 6, FIG. 11, FIG. 13, etc.), a graphical output of the progress of any method or systems discussed herein (e.g., FIG. 12, FIG. 14, etc.), or the like.

Without in any way limiting the scope, interpretation, or application of the claims appearing herein, a technical effect of one or more of the examples disclosed herein is to provide adjustments to how to store and structure the resource semantics information in a way that facilitates efficient semantics-based query (e.g., reducing the query processing time).

In a conventional ETSI M2M system, semantic annotation of M2M resources is a method for adding semantic information to M2M resources so that provides consistent data translation and data interoperability to heterogeneous M2M applications. Semantically annotated M2M resources can be contacted by an M2M application that understands what data are provided by the resources and what the provided data means. These annotations provide more meaningful descriptions and expose M2M data than traditional M2M system alone. To describe relationships between resources with other things, it defines a relation attribute, which has a URI pointing to another ETSI M2M resource.

While the oneM2M architecture is described by way of background herein and may be used to illustrate subject matter described herein, it is understood that implementations of the subject matter described herein may vary while remaining within the scope of the present disclosure. One skilled in the art will also recognize that the disclosed subject matter is not limited to implementations using the oneM2M architecture discussed above, but rather may be implemented in other architectures and systems, such as ETSI M2M and other M2M systems and architectures.

Figure 32A:
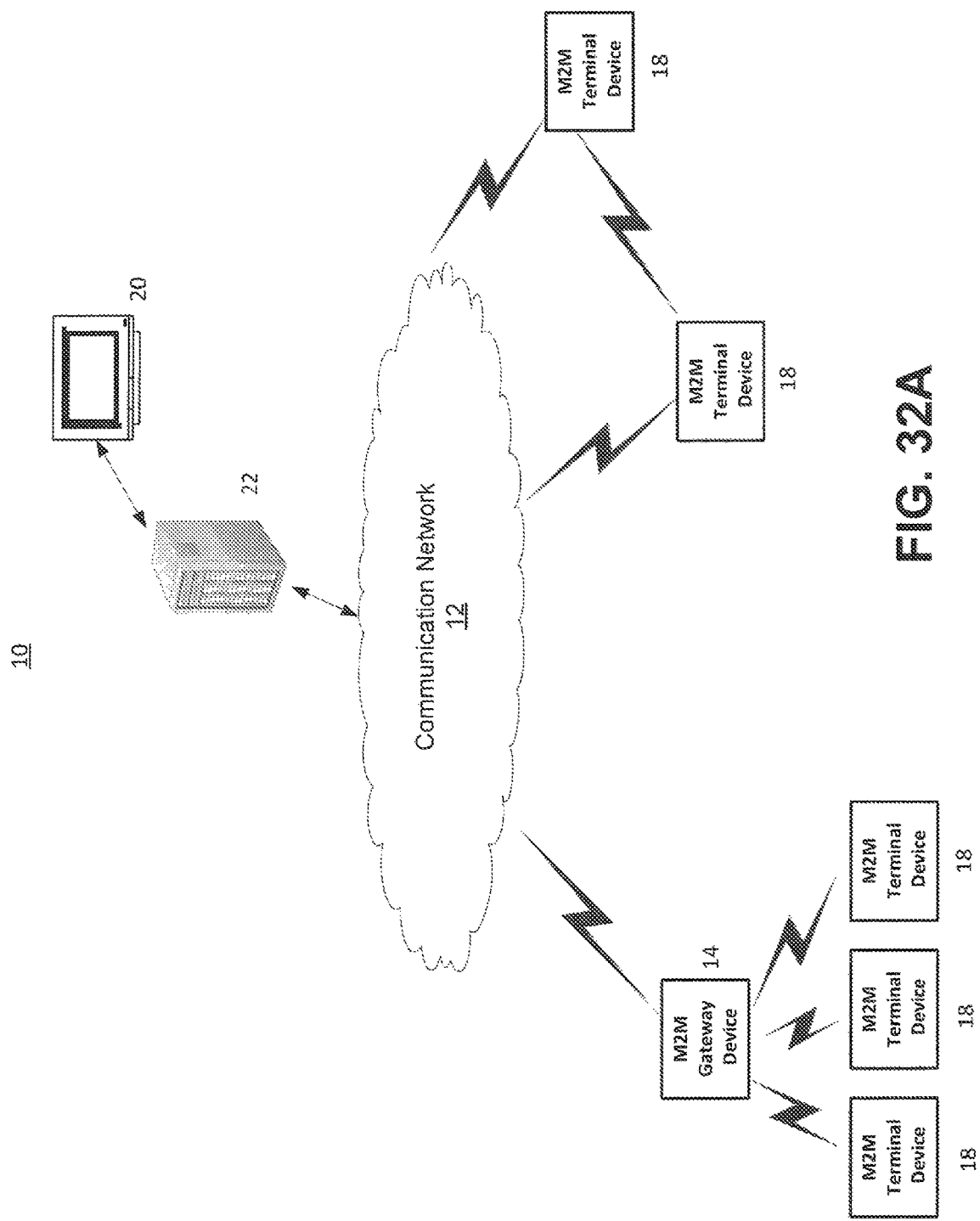
FIG. 32A is a system diagram of an example machine-to-machine (M2M) or Internet of Things (IoT) communication system in which one or more disclosed examples may be implemented.

FIG. 32A is a diagram of an example machine-to machine (M2M), Internet of Things (IoT), or Web of Things (WoT) communication system 10 in which one or more disclosed concepts, such as semantic architecture 701 and components therein may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 32A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 32A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 32B:
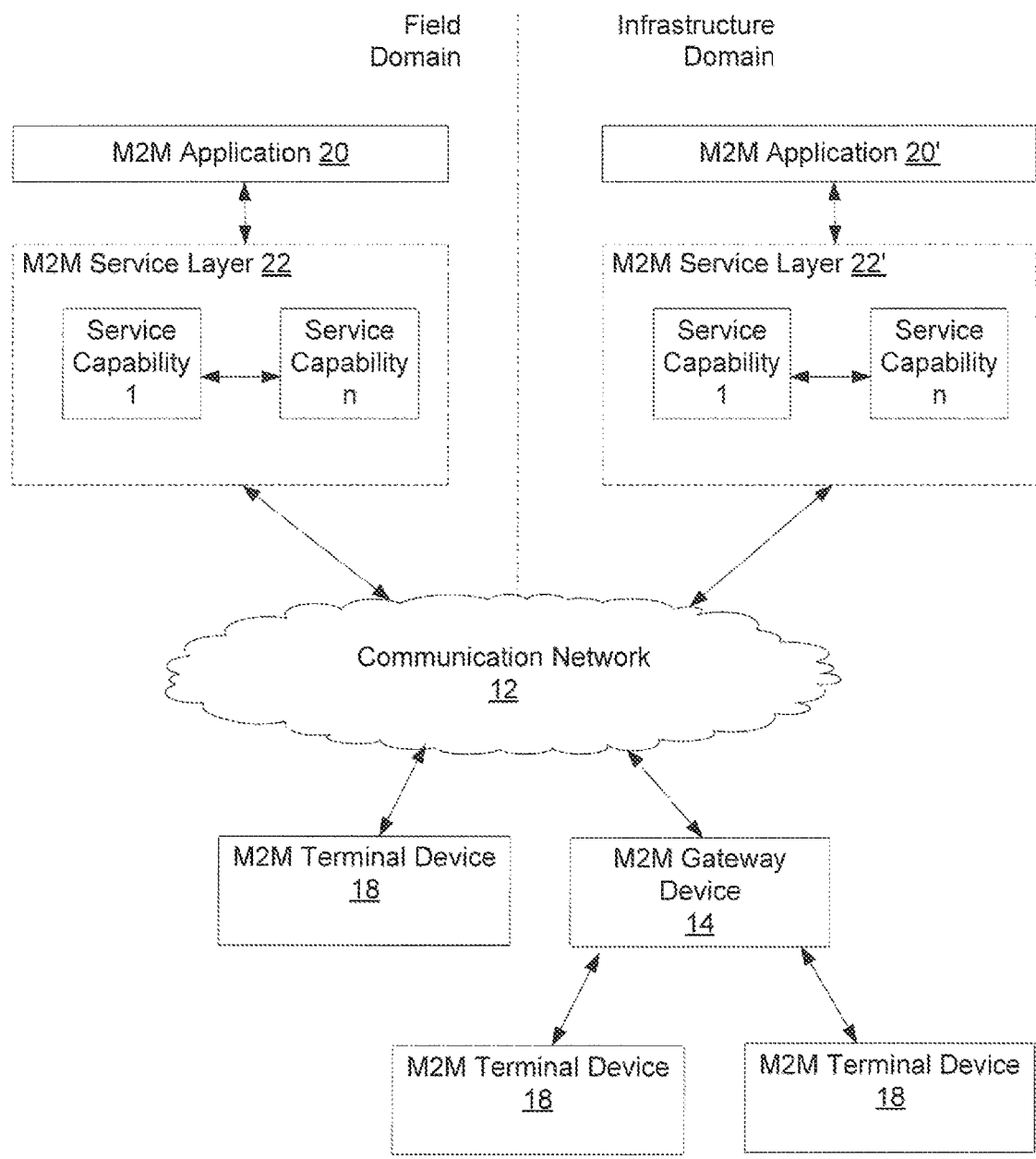
FIG. 32B is a system diagram of an example architecture that may be used within the M2M/IoT communications system illustrated in FIG. 32A.

Referring to FIG. 32B, the illustrated M2M service layer 22 (e.g., CSE as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 32B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that provide semantics annotation instances, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Semantics annotation and semantics repository of the present application may be implemented as part of a service layer. The service layer (e.g. CSE 901) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the semantics repository of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the semantics repository of the present application can be implemented as part of an M2M network that uses a Service Oriented Architecture (SOA) and/or a resource-oriented architecture (ROA) to access services such as the semantics repository of the present application.

Figure 32C:
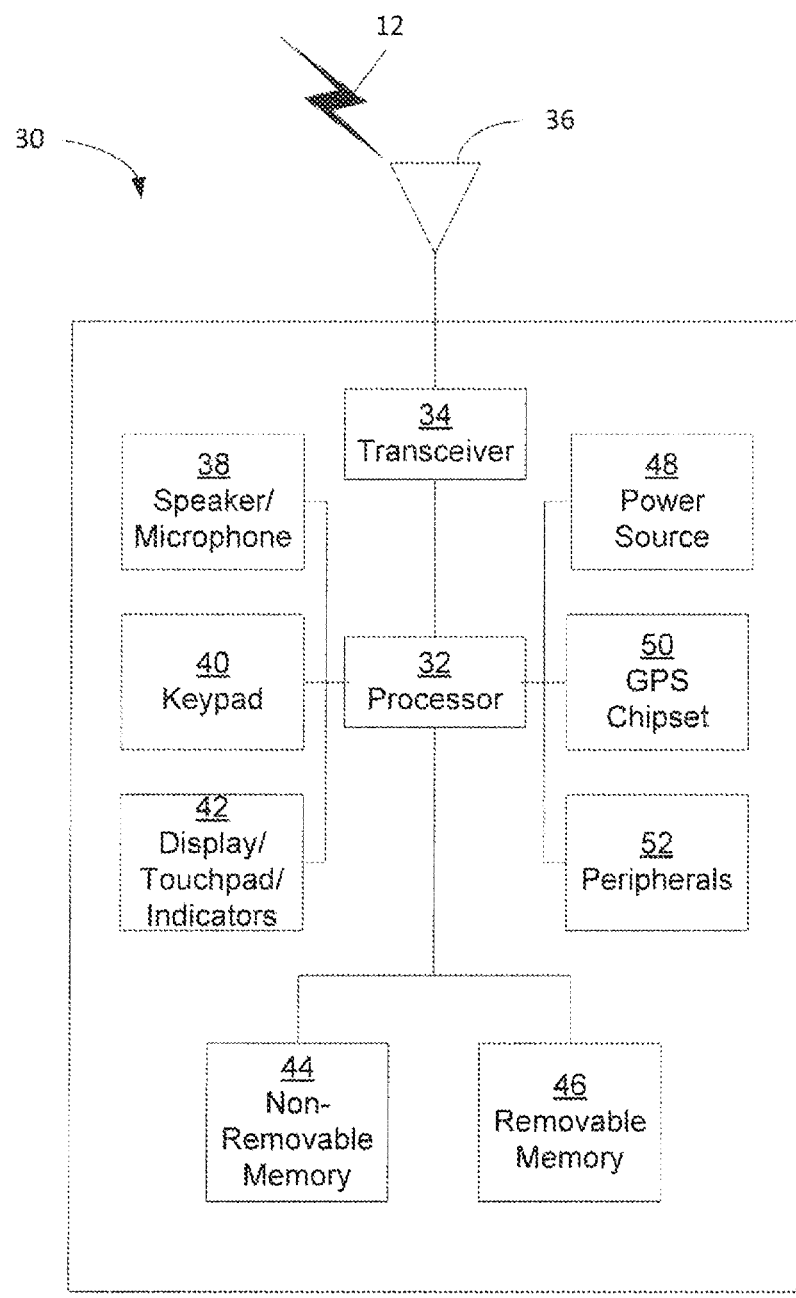
FIG. 32C is a system diagram of an example M2M/IoT terminal or gateway device that may be used within the communications system illustrated in FIG. 32A.

FIG. 32C is a system diagram of an example M2M device 30, such as an M2M terminal device 18 or an M2M gateway device 14 for example. As shown in FIG. 32C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. This device (similar to gateway 733, ambient sensor 734, weighing scale 736, treadmill 737, blood pressure monitor 735, client 710, semantics repository 720, and others) may be a device that uses the disclosed systems and methods for semantics annotation.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 32C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 32C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the semantics annotation services in some of the examples described herein are successful or unsuccessful (e.g., Table 4 or Table 5), or otherwise indicate a status of the semantics repository and associated components. The control lighting patterns, images, or colors on the display or indicators 42 may be reflective of the status of any of the method flows or components in the FIG.'S illustrated or discussed herein (e.g., FIG. 12, 14-20, etc.) or reflective of the information in any of the tables herein. Disclosed herein are messages and procedures of semantics annotation services. The messages and procedures can be extended to provide interface/API for users to request semantics annotation services via an input source (e.g., speaker/microphone 38, keypad 40, or display/touchpad 42) and request, configure, or query semantics information and semantics annotation services, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 32D:
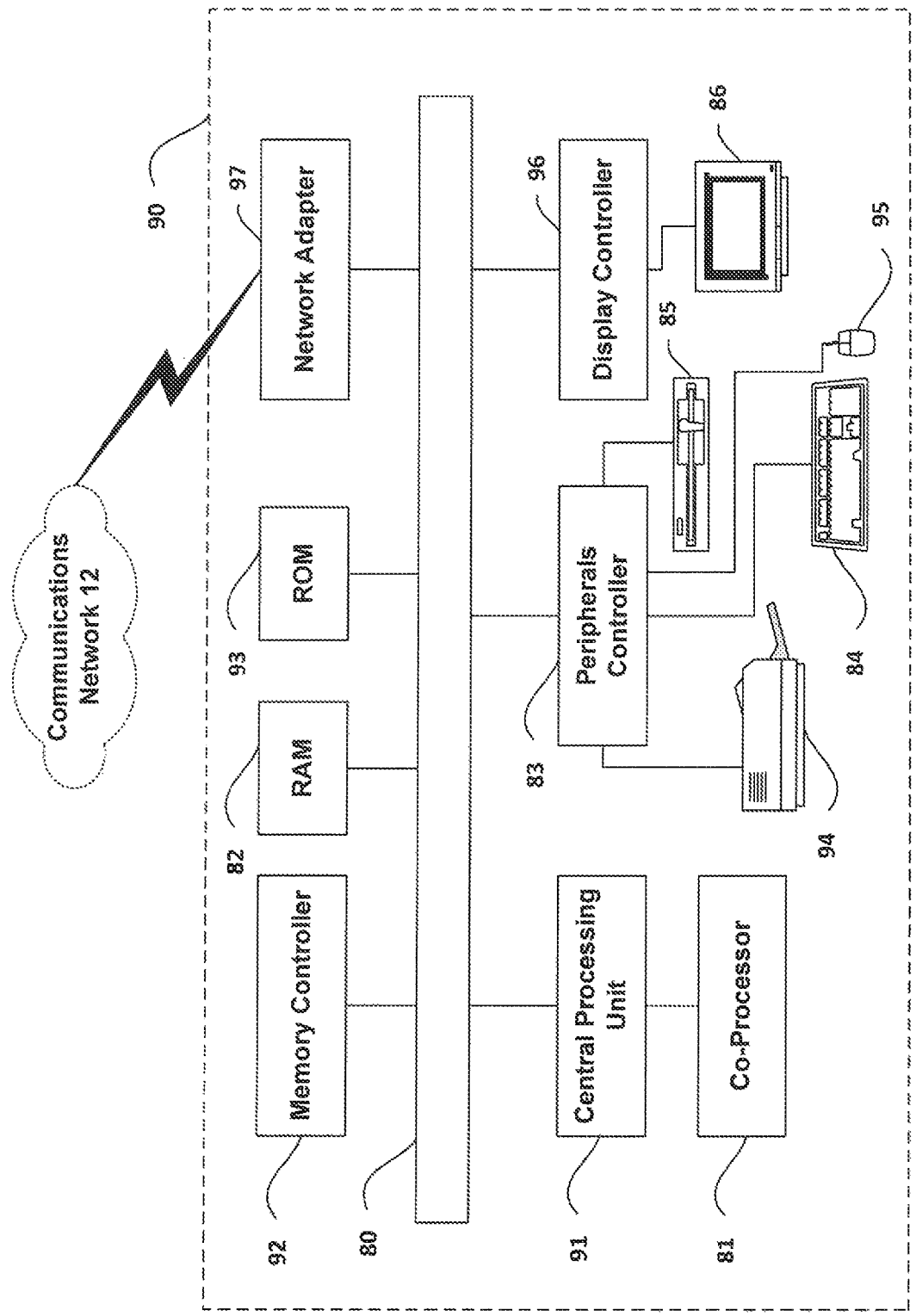
FIG. 32D is a block diagram of an example computing system in which aspects of the communication system of FIG. 32A may be embodied.

FIG. 32D is a block diagram of an exemplary computing system 90 on which, for example, the M2M service platform 22 of FIG. 32A and FIG. 32B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for semantics annotation, such as generating a semantics annotation instance.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 32A and FIG. 32B.

It is understood that any or all of the systems, methods and processes described herein may be in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein which includes as provided in the claims). Such other examples are intended to be within the scope of the claims if they have structural elements that do not differ from the literal language of the claims, or if they include equivalent structural elements with insubstantial differences from the literal languages of the claims.

What is claimed:

1. A device for semantics annotation, the device comprising:
    a processor; and
    a memory coupled with the processor, the memory comprising executable instructions that when executed by the processor cause the processor to effectuate operations comprising:
        receiving a request for semantics annotation of a first resource, wherein the first resource is a resource representation;
        based on the request for semantics annotation of the first resource, receiving at least one semantics resource of the first resource, wherein:
            the at least one semantics resource is a child resource of the first resource,
            the request comprises filter criteria associated with the first resource in order to discover the corresponding semantics annotation instance of the first resource, and
            the at least one semantics resource comprises a description attribute that describes semantics of the first resource;
        generating a semantics annotation instance of the first resource based on the at least one semantics resource; and
        providing instructions to move the semantics annotation instance to another device, responsive to the first resource being moved from a first location to a second location.

2. The device of claim 1, wherein the receiving the at least one semantics resource of the first resource is further based on which layer in a resource hierarchy the semantics annotation is being performed.

3. The device of claim 1, the operations further comprising generating triples from the at least one semantics resource.

4. The device of claim 1, the operations further comprising generating a record linking the semantics annotation instance and the first resource.

5. The device of claim 1, the operations further comprising updating a record linking the semantics annotation instance and the first resource.

6. The device of claim 1, the operations further comprising providing instructions to send a record linking the semantics annotation instance and the first resource to a resource repository.

7. The device of claim 1, wherein the request comprises a uniform resource indicator of the semantics annotation instance of the first resource.

8. A method for semantics annotation, the method comprising:
    receiving a request for semantics annotation of a first resource, wherein the first resource is a resource representation;
    based on the request for semantics annotation of the first resource, receiving at least one semantics resource of the first resource, wherein:
        the at least one semantics resource is a child resource of the first resource,
        the request comprises filter criteria associated with the first resource in order to discover the corresponding semantics annotation instance of the first resource, and the at least one semantics resource comprises a description attribute that describes semantics of the first resource;

generating a semantics annotation instance of the first resource based on the at least one semantics resource; and providing instructions to move the semantics annotation instance to another device, responsive to the first resource being moved from a first location to a second location.

9. The method of claim 8, wherein the receiving the at least one semantics resource of the first resource is further based on which layer in a resource hierarchy the semantics annotation is being performed.

10. The method of claim 8, further comprising generating triples from the at least one semantics resource.

11. The method of claim 8, further comprising generating a record linking the semantics annotation instance and the first resource.

12. The method of claim 8, the operations further comprising providing instructions to send a record linking the semantics annotation instance and the first resource to a resource repository.

13. A non-transitory computer readable storage medium storing computer executable instructions that when executed by a computing device cause said computing device to effectuate operations comprising:

receiving a request for semantics annotation of a first resource, wherein the first resource is a resource representation;

based on the request for semantics annotation of the first resource, receiving at least one semantics resource of the first resource, wherein:

the at least one semantics resource is a child resource of the first resource, the request comprises filter criteria associated with the first resource in order to discover the corresponding semantics annotation instance of the first resource, and the at least one semantics resource comprises a description attribute that describes semantics of the first resource;

generating a semantics annotation instance of the first resource based on the at least one semantics resource; and providing instructions to move the semantics annotation instance to another device, responsive to the first resource being moved from a first location to a second location.

14. The non-transitory computer readable storage medium of claim 13, wherein the receiving the at least one semantics resource of the first resource is further based on which layer in a resource hierarchy the semantics annotation is being performed.

15. The non-transitory computer readable storage medium of claim 13, further comprising generating triples from the at least one semantics resource.

16. The non-transitory computer readable storage medium of claim 13, further comprising generating a record linking the semantics annotation instance and the first resource.

17. The non-transitory computer readable storage medium of claim 13, the operations further comprising updating a record linking the semantics annotation instance and the first resource.

18. The non-transitory computer readable storage medium of claim 13, the operations further comprising providing instructions to send a record linking the semantics annotation instance and the first resource to a resource repository.

19. The non-transitory computer readable storage medium of claim 13, wherein the request comprises a uniform resource indicator of the semantics annotation instance of the first resource.

20. The method of claim 8, wherein the request comprises a uniform resource indicator of the semantics annotation instance of the first resource.

* * * * *